(12) United States Patent
Brady

(10) Patent No.: US 9,881,277 B2
(45) Date of Patent: Jan. 30, 2018

(54) WRIST BAND HAPTIC FEEDBACK SYSTEM

(71) Applicant: Amazon Technologies, Inc., Seattle, WA (US)

(72) Inventor: Tye Michael Brady, Southborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/083,107

(22) Filed: Mar. 28, 2016

(65) Prior Publication Data

US 2017/0278052 A1   Sep. 28, 2017

(51) Int. Cl.
*G06K 7/10* (2006.01)
*G06Q 10/08* (2012.01)

(52) U.S. Cl.
CPC ....... *G06Q 10/087* (2013.01); *G06K 7/10891* (2013.01)

(58) Field of Classification Search
USPC ............... 235/385, 492, 487; 705/7.29, 28
See application file for complete search history.

(56) References Cited

U.S. PATENT DOCUMENTS

| | | | |
|---|---|---|---|
| 7,504,949 B1 | 3/2009 | Rouaix et al. | |
| 7,911,324 B2 * | 3/2011 | Breed | G01S 13/878 307/10.1 |
| 8,280,547 B2 | 10/2012 | D'Andrea et al. | |
| 9,087,314 B2 | 7/2015 | Hoffman et al. | |
| 9,242,799 B1 | 1/2016 | O'Brien et al. | |
| 2007/0063895 A1 * | 3/2007 | August | G06K 7/0008 342/359 |
| 2007/0156312 A1 * | 7/2007 | Breed | B60C 23/007 701/31.4 |
| 2009/0207694 A1 | 8/2009 | Guigne et al. | |

(Continued)

OTHER PUBLICATIONS

U.S. Appl. No. 15/083,083, filed Mar. 28, 2016, Titled: Ultrasonic Bracelet and Receiver for Detecting Position in 2D Plane.

(Continued)

*Primary Examiner* — Allyson Trail
(74) *Attorney, Agent, or Firm* — Kilpatrick Townsend & Stockton LLP

(57) ABSTRACT

Inventory management systems and related methods employ radio frequency based tracking of a worker's hands to monitor performance of inventory tasks. An inventory management system includes inventory bins, a user-wearable unit configured to be worn in proximity to a user's hand, fixed RF antennas configured to transmit at least one RF interrogation signal and receive at least one RF response signal, a RF transceiver operatively coupled with the fixed RF antennas, and a management module operatively coupled with the RF transceiver. The user-wearable unit includes an RF transceiver configured to transmit RF response signals in response to reception of the at least one RF interrogation signal. The management module is configured to process signals generated by the RF transceiver to track locations of the user-wearable unit and identify an inventory bin based on proximity of the user-wearable unit to the identified inventory bin to monitor performance of an inventory system task.

20 Claims, 17 Drawing Sheets

(56) References Cited

U.S. PATENT DOCUMENTS

| | | | | |
|---|---|---|---|---|
| 2011/0079652 A1* | 4/2011 | Bass | ........................ | E05B 19/00 |
| | | | | 235/492 |
| 2014/0073353 A1* | 3/2014 | Shkedi | .................. | G01S 5/0252 |
| | | | | 455/456.1 |
| 2014/0214631 A1* | 7/2014 | Hansen | ................ | G06Q 10/087 |
| | | | | 705/28 |
| 2015/0081088 A1* | 3/2015 | Lyon | .................. | G06Q 10/0875 |
| | | | | 700/216 |
| 2016/0189174 A1* | 6/2016 | Heath | ................ | G06Q 30/0201 |
| | | | | 705/7.29 |

OTHER PUBLICATIONS

PCT/US2017/022250, International Search Report and Written Opinion, dated Aug. 7, 2017, 13 pages.

Arthaber, H. And K. Witrisal. Presentation [online]. Ranging and Positioning of UHF RFID Tags: RFID Real-Time Localization for Flexible Production Environments (REFlex). Mar. 31, 2016 [retrieved on Jul. 28, 2017]. Retrieved from the Internet: <URL:http://rainrfid.org/wp-content/uploads/2016/03/RAIN-RFID-TUGraz.pdf>, 26 pages.

Witrisal et al, "High-accuracy positioning for indoor applications: RFID, UWB, 5G, and beyond," 2016 IEEE International Conference on RFID (RFID), Orlando, Florida, USA (May 3-5, 2016), 7 pages.

* cited by examiner

WRIST BAND HAPTIC FEEDBACK SYSTEM

CROSS-REFERENCE TO RELATED APPLICATIONS

This application is related to and incorporates by reference for all purposes the full disclosure of co-pending U.S. patent application Ser. No. 15/083,083, filed Mar. 28, 2016, entitled "ULTRASONIC BRACELET AND RECEIVER FOR DETECTING POSITION IN 2D PLANE".

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial.

In many inventory systems, an incoming inventory item is typically stored into an inventory bin so as to be quickly retrievable in response to an order for the inventory item. An inventory management system typically stores the identification and location of the inventory bin in which the inventory item is stored for use in locating and processing the inventory item in response to an order for the inventory item. For example, an inventory system worker can pick up the incoming inventory item and place the inventory item into the inventory bin. To keep track of where the inventory item is stored, it is important to efficiently and accurately identify the inventory bin into which the inventory item is placed. Existing approaches for keeping track of where inventory items are stored, however, may require the inventory system worker to perform time consuming acts beyond placing the inventory item into an inventory bin and retrieving the inventory item from the inventory bin, such as pushing a button associated with the inventory bin or scanning a barcode associated with the inventory bin. And while the inventory system worker may be required to perform less time consuming tasks when a computer vision system is used to track placement of the inventory item, such a computer vision system may be computationally intensive and expensive. Accordingly, improved approaches for keeping track of where an inventory item is stored are of interest.

BRIEF DESCRIPTION OF THE DRAWINGS

Various embodiments in accordance with the present disclosure will be described with reference to the drawings, in which.

DETAILED DESCRIPTION

Figure 1:
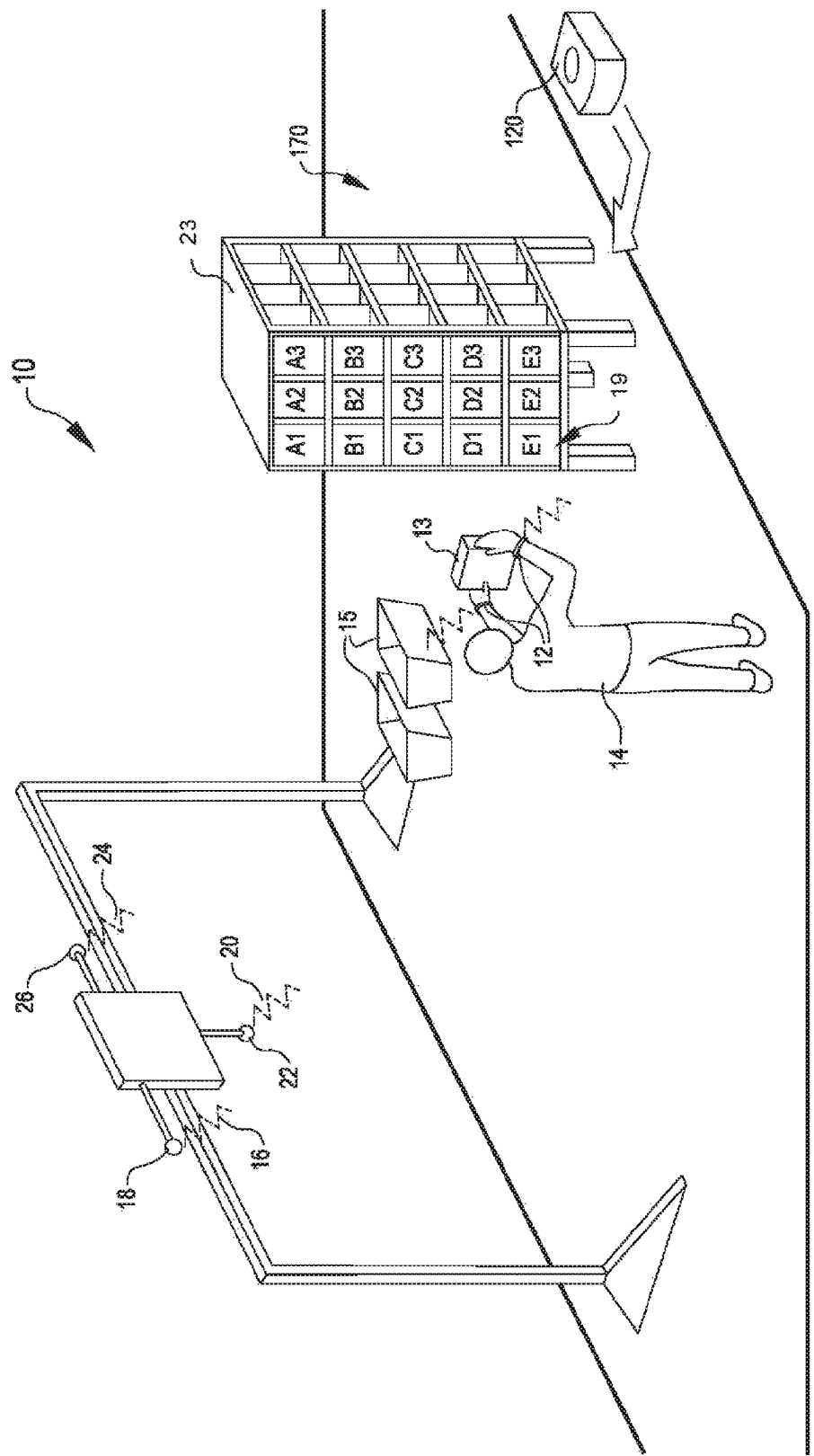
FIG. 1 illustrates a radio frequency (RF) tracking system configured to monitor performance of an inventory system task, in accordance with many embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Inventory management systems are provided that include a radio frequency (RF) based tracking system that tracks movement of one or more hands of an inventory system worker to monitor performance of inventory tasks. The RF based tracking system can include one or more user-wearable units (e.g., one or more wristbands) that are tracked via RF signals to accurately identify their location in an applicable 3D space, thereby providing real time tracking information of the inventory system worker's hand(s) that can be used to improve efficiency of the inventory management system.

A user-wearable unit can be worn on one or both wrists of an inventory system worker who retrieves inventory items from storage locations (e.g., inventory bins, either fixed or movable) and/or places inventory items into storage locations. For example, when placing an inventory item into a storage location, the item can be retrieved by the worker from a transport container. When the item is taken out of the transport container, the item can be identified (e.g., via bar scan or optical means). The item may be automatically assigned a volume optimized location ("storage cell") to be stored within a designated storage volume (mobile or fixed). The identified storage cell can be conveyed to the associate who then moves the item into the intended storage cell. Movement of the item can be tracked via tracking the location of the user-wearable unit(s), thereby tracking the movement of the worker's hands that are moving the item. The user-wearable unit(s) can be tracked via low power RF link monitoring from a suitable number of antennas. The tracked location of the user-wearable unit(s) is compared with known locations of inventory cells to identify the inventory cell into which the worker places the item or from which the worker retrieves the item. The identified inventory cell can be recorded as the new location of the item and/or can be compared with a system designated inventory cell for the item. If the identified inventory cell does not match a system designated inventory cell, a suitable haptic feedback can be delivered to the worker to alert the worker to a possible incorrect item placement or retrieval. In many embodiments, the worker can override the inventory system. For example, the worker can twist the worker's left wrist, thereby twisting a user-wearable wristband worn thereon, to generate an input command to the inventory system to override the system designated inventory cell and accept the worker's placement of the item via the workers right hand (tracked by a user-wearable wrist band on the worker's right hand) into a storage cell selected by the worker. The RF based tracking system can also be operated in a mode in which the worker places items into storage cells selected by the worker, thereby allowing the worker to optimize placement of the items and the placement of the items to be automatically tracked by the inventory system.

Turning now to the drawing figures in which like reference numerals refer to like elements in the various drawing figures, FIG. 1 illustrates a RF based tracking system 10 configured to monitor performance of an inventory system task, in accordance with many embodiments. The RF tracking system 10 includes one or more user-wearable units 12 (e.g., wrist bands in the illustrated embodiment) that are worn in proximity to one or both hands of an inventory system worker 14. The tracking system 10 tracks the location of the user-wearable unit(s) 12 via at least one of a first RF interrogation signal 16 emitted by a first RF antenna 18, a second RF interrogation signal 20 emitted by a second RF antenna 22 and a third RF interrogation signal 24 emitted by a third RF antenna 26. Each of the user-wearable units 12 is configured to transmit a first RF response signal in response to reception of the first RF interrogation 16 signal by the user-wearable unit 12, transmit a second RF response signal in response to reception of the second RF interrogation 20 signal by the user-wearable unit 12 and transmit a third RF response signal in response to reception of the third RF interrogation signal 24 by the user-wearable unit 12. The location of each of the user-wearable units 12 can be calculated based on known locations of the RF antennas 18, 22, 26 and respective time of flights of the respective RF signals between each of the RF antennas 18, 22, 26 and each of the user-wearable units 12 using known approaches.

In many embodiments, the location of each of the user-wearable units 12 is tracked, thereby tracking the location of the left hand and/or the right hand of the worker 14. In many embodiments, the RF tracking system 10 tracks the locations of the workers left hand and/or right hand to monitor performance of an inventory task assigned to the worker 14, such as placing an inventory item 13 into an inventory bin 19, retrieving an inventory item 13 from an inventory bin 19, placing an inventory item 13 into an inventory tote 15 or retrieving an inventory item 13 from an inventory tote 15. In many embodiments, the inventory system task is accomplished within an inventory workspace 170.

In the embodiment illustrated in FIG. 1, the RF tracking system 10 is configured to track the left hand and/or the right hand of the worker 14 relative to inventory bins of a portable inventory holder 23. The portable inventory holder 23 has a plurality of separate inventory bins 19. In many embodiments, the inventory holder 23 is movable within an inventory facility via a suitable mobile drive unit 120, such as any of the mobile drive units described herein. In the illustrated embodiment, the RF antennas 18, 22, 26 are not mounted to the inventory holder 23. Instead, in the illustrated embodiment, the RF antennas 18, 22, 26 are mounted in known locations separate from the inventory holder 23. The inventory holder 23 is controllably placed relative to the RF antennas 18, 22, 26 within a suitable positional tolerance (e.g., within three-quarters of an inch). By placing the inventory holder 23 relative to the RF antennas 18, 22, 26 within a suitable positional tolerance, each of the inventory bins 19 is thereby placed relative to the RF antennas 18, 22, 26 within a suitable positional tolerance. The resulting time sequence of locations of the user-wearable units 12 is compared to known locations of the inventory bins 19 to detect when the user-wearable unit(s) 12 comes within a suitable proximity of any particular inventory bin 19 corresponding to an interaction between the worker 14 and the particular inventory bin 19.

In many embodiments, the RF tracking system 10 is used to automatically monitor performance of inventory tasks assigned to the inventory worker 14. For example, the inventory worker 14 can be instructed to place an inventory item into a system designated one of the inventory bins 19, such as into inventory bin (C2). Because the inventory holder 23 is positioned to a known position relative to the RF antennas 18, 22, 26, the RF tracking system 10 can track the location of the worker's 14 left hand and/or right hand relative to the inventory bins 19, including relative to the designated inventory bin (C2). The tracked locations can be continually compared to known locations of the inventory bins 19 to detect when the tracked locations come within a designated distance or within a designated volume corresponding to any of the inventory bins 19, including corresponding to the designated inventory bin (C2). If such a qualifying proximity is detected, the corresponding inventory bin can be identified and compared to the designated inventory bin (C2) into which the inventory item should be placed per instructions to the worker 14. If the identified inventory bin matches the designated inventory bin (C2), the RF tracking system 10 can be configured to proceed based on the assumption that the inventory item has been placed into the designated inventory bin (C2). For example, by proceeding based on the assumption that the inventory item has been placed in the designated inventory bin (C2), it may be possible to proceed without the worker 14 performing an action that confirms that the inventory item was placed into the designated bin (C2), such as via scanning of an identification tag for the designated inventory bin (C2). By automatically tracking performance of the assigned inventory task, the RF tracking system 10 can be used to reduce or eliminate actions performed by the worker 14 to confirm performance of an assigned inventory task. In a similar manner, the RF tracking system 10 can be used to monitor performance of an inventory task in which the worker 14 is instructed to retrieve an inventory item from a designated one of the inventory bins 19.

In many embodiments, the RF tracking system 10 is configured to provide feedback to the worker 14 based on the tracked position(s) of the worker's left hand and/or right hand. For example, each of the user-wearable units 12 can include a haptic feedback mechanism that is controlled to provide suitable haptic feedback to the worker 14 that indicates whether the worker 14 is interacting with the designated inventory bin (C2) or another of the inventory bins 19 different from the system designated inventory bin (C2). Any suitable communication means can be used to transmit a signal to the respective user-wearable unit 12 indicative of whether the worker 14 is interacting with the designated inventory bin (C2) or not. For example, user-wearable unit(s) 12 can include a communication unit (e.g., a Wi-Fi transceiver) to receive a signal indicative of whether the worker 14 is interacting with the designated inventory bin (C2) or another of the inventory bins 19. If a signal is received by the user-wearable unit 12 that the worker is interacting with the designated inventory bin (C2), the user-wearable unit 12 can control the haptic feedback mechanism to provide a confirmatory haptic feedback to the worker 14. If a signal is received by the user-wearable unit 12 that the worker 14 is interacting with an inventory bin 19 other than the designated inventory bin (C2), the user-wearable unit 12 can control the haptic feedback mechanism to provide a haptic feedback to the worker 14 indicating that the worker 14 is interacting with an inventory bin 19 other than the designated inventory bin (C2).

The RF tracking system 10 can also be configured to provide guidance feedback to the worker 14 based on the tracked positions of the user-wearable unit 12. For example, a guidance signal can be transmitted to the user-wearable unit 12 indicating one or more directions in which the worker 14 should move the worker's respective hand to interact with the designated inventory bin (C2). The user-wearable unit 12 can be configured to control a suitable communication means to communicate to the worker 14 one or more directions to move the worker's respective hand to interact with the designated inventory bin (C2). For example, the user-wearable unit 12 can include light-emitting diodes (LEDs) (e.g., distributed along an upper surface of the unit 12 and/or along a lower surface of the unit 12) that can be selectively activated based on the orientation of the unit 12 (which can be determined by processing output from the motion detection unit 36, for example, output from an accelerometer indicative of orientation of the unit 12 relative to vertical) to communicate to the worker 14 one or more directions to move the worker's respective hand to interact with the designated inventory bin (C2). The LEDs can have any suitable distribution, shape, and/or color. For example, any suitable number of the LEDs can be shaped to display a directional arrow and activated to indicate the corresponding direction for the worker 14 to move the worker's respective hand to interact with the designated inventory bin (C2). As another example, the haptic feedback mechanism 34 can be configured to provide haptic feedback, which can be based on the orientation of the unit 12, to communicate to the worker 14 one or more directions to move the worker's respective hand to interact with the designated inventory bin (C2). As another example, the unit 12 can include a display screen on which guidance can be presented (e.g., a direction arrow) to communicate to the worker 14 one or more directions to move the worker's respective hand to interact with the designated inventory bin (C2).

The RF tracking system 10 can also be configured to transmit any suitable data from the user-wearable unit 12. For example, the user-wearable unit 12 can be configured to embed data into one or more of the RF response signals to communicate any suitable attribute of the user-wearable unit 12, such as, for example, identification of the worker 14, indication of whether the user-wearable unit 12 is worn on the left hand or the right hand of the worker 14, a charge state of the user-wearable unit 12, an operational status (e.g., any existing faults) of the user-wearable unit 12 or a duration of use of the user-wearable unit 12. Alternatively, any other suitable communication approach can be used to communicate any suitable attribute of the user-wearable unit 12, including via Wi-Fi transmission.

Figure 2:
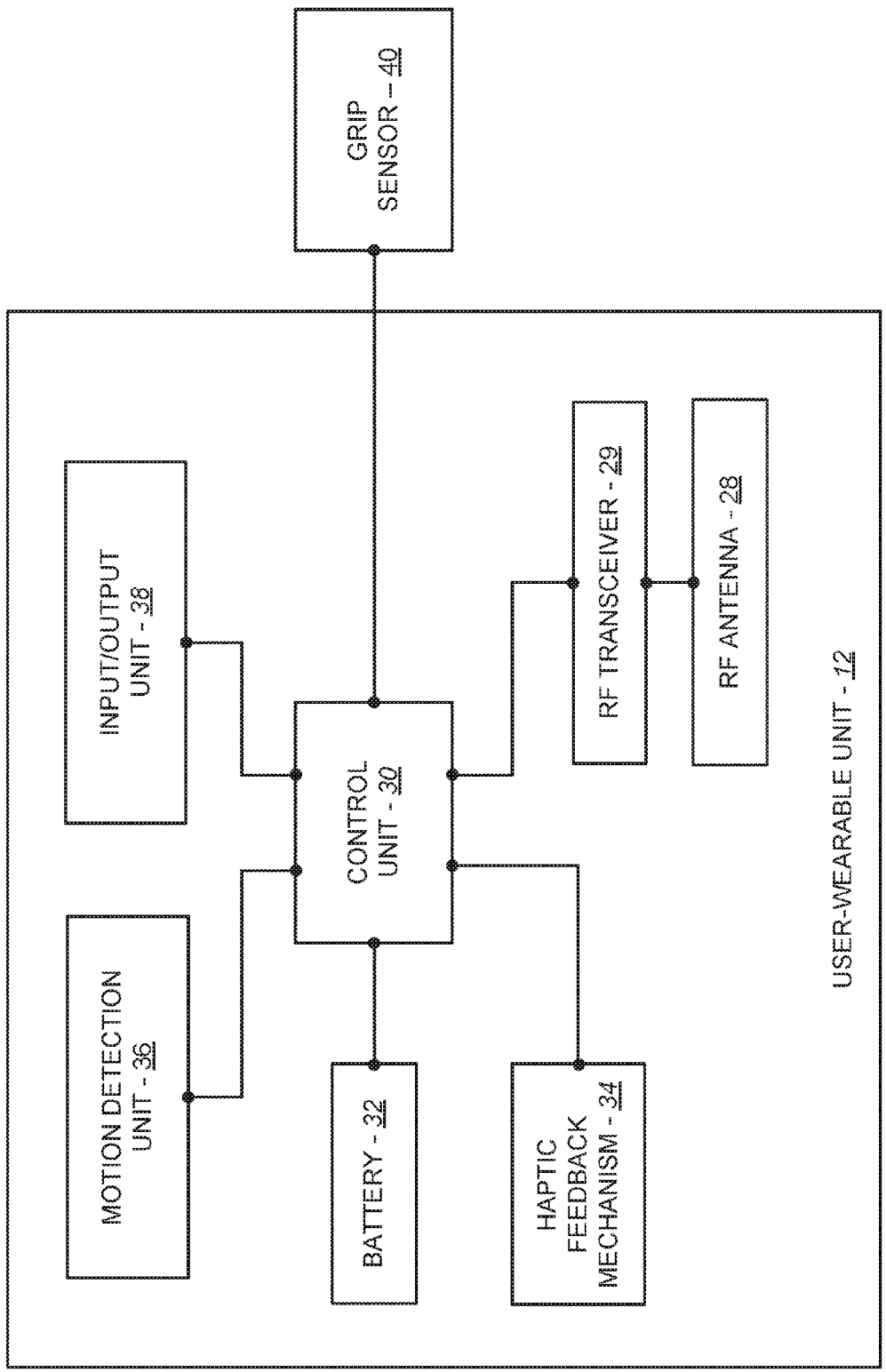
FIG. 2 is a simplified schematic diagram illustrating a user-wearable unit of an RF tracking system configured to monitor performance of an inventory system task, in accordance with many embodiments.

FIG. 2 is a simplified schematic diagram illustrating an embodiment of the user-wearable unit 12. In the illustrated embodiment, the user-wearable unit 12 includes an RF antenna 28, an RF transceiver 29, a control unit 30, a power source (e.g., battery) 32, a haptic feedback mechanism 34, a motion detection unit 36 and an input/output unit 38. The control unit 30 is operatively connected to the RF transceiver 28, the battery 32, the haptic feedback mechanism 34, the motion detection unit 36, and the input/output unit 38. The control unit 30 can include any suitable electronic components including, but not limited to, a processor, memory, and/or equivalent electronic circuits.

The control unit 30 can detect reception of the RF interrogation signals 16, 20, 24 via the RF antenna 28 and control the RF transceiver 29 to transmit the RF response signals in response to the reception of the RF interrogation signals 16, 20, 24. The control unit 30 can be configured to embed data into the RF response signals indicative of any suitable attribute of the user-wearable unit 12 such as a unique identifier that can be used to identify the worker 14 and/or what hand of the worker 14 on which the user-wearable unit 12 is worn, a charge state of the user-wearable unit 12, an operational status (e.g., any existing faults) of the user-wearable unit 12 or a duration of use of the user-wearable unit 12.

In many embodiments, the control unit 30 controls operation of the haptic feedback mechanism 34 to provide haptic feedback to the worker 14 indicative of whether the worker is interacting with the designated inventory bin (C2) or an inventory bin 19 other than the designated inventory bin (C2). The control unit 30 can receive an input indicating that the worker 14 is interacting with an inventory bin 19 (i.e., the position of the user-wearable unit 12 is within a designated proximity of an inventory bin 19) and whether the identified inventory bin 19 with which the worker 14 is interacting corresponds to the designated inventory bin (C2) or an inventory bin 19 other than the designated inventory bin (C2). For example, the input can be transmitted to the input/output unit 38 (which can include a suitable communication unit such as a wireless transceiver).

In many embodiments, the user-wearable unit 12 includes a motion detection unit 36 configured to generate data that can be processed to track orientation of the user-wearable unit 12. The motion detection unit 36 can include any suitable orientation data generating device, such as a gyroscope chip configured to track orientation of the user-wearable unit 12 or an accelerometer chip configured to track translational and/or rotational accelerations of the user-wearable unit 12. By tracking motion of the user-wearable unit 12, the output from the motion detection unit 36 can be processed to detect input commands generated by the worker 14 by moving the user-wearable unit 12 in recognizable motions corresponding to respective input commands. For example, the input commands can be generated by any variety or combination of motions, e.g., rotation, vertical or horizontal motion, shaking, acceleration above certain threshold(s), or others, as well as combinations of motions of both hands (i.e., wearable units worn on each hand or wrist). The motion generated input commands can include any suitable input command from the worker 14, for example, to confirm completion of a task (e.g., item has been placed into a storage location), to override a task instruction (e.g., to override an instruction to place an item into a system designated storage location to allow the worker 14 to place the item into a storage location selected by the worker 14), to override haptic feedback for particular tasks, to indicate picking of an item from a storage location, to indicate placement of an item to a storage location, to indicate other info to the overall system (such as an item to be picked is not present, or a location for placement of item is not available or already full) or any other input commands.

The RF tracking system 10 can include a user-worn grip sensor 40 that outputs a signal indicative of whether the inventory worker 14 is holding an inventory item. The grip sensor 40 can be supported in any suitable way. For example, the grip sensor 40 can be mounted to a glove worn by the inventory worker 14. The grip sensor 40 can have any suitable configuration. For example, the grip sensor 40 can include one or more pressure sensors on the fingertips and/or palms, one or more pressure sensors or strain gauges on wristbands, one or more proximity sensors, or any suitable combination of the foregoing items. In many embodiments, the control unit 30 receives an output signal generated by the grip sensor 40. The user-wearable unit 12 can transmit a signal indicative of the output of the grip sensor 40 so that the RF tracking system 10 can process the tracked locations of the user-wearable unit(s) 12 in combination with the output from the grip sensor 40 to detect when an inventory item is placed into the identified inventory bin or retrieved from the identified inventory bin.

Figure 3:
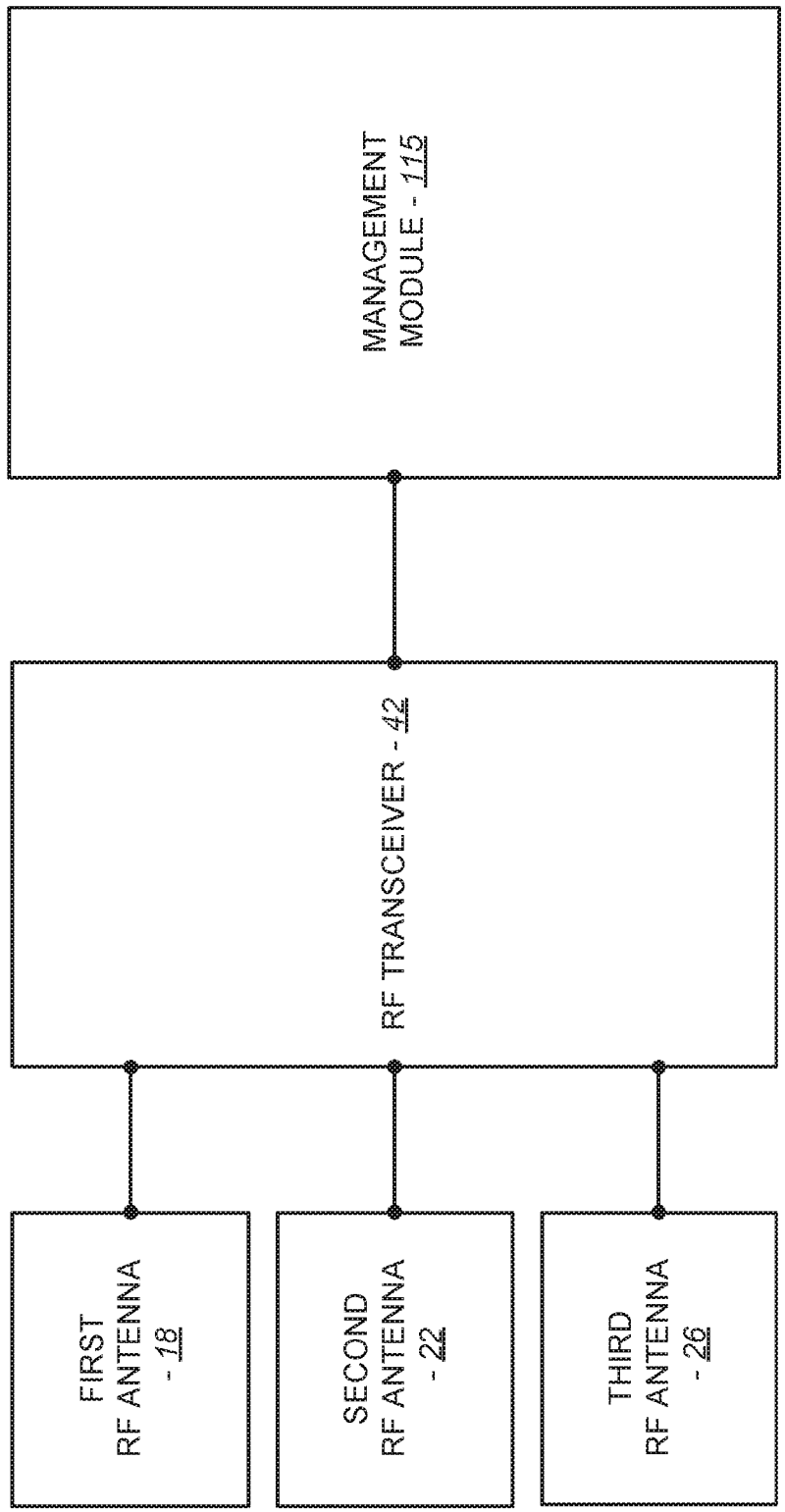
FIG. 3 is a simplified schematic diagram illustrating components of an RF tracking system configured to monitor performance of an inventory system task, in accordance with many embodiments.

FIG. 3 is a simplified schematic diagram illustrating additional components of the RF tracking system 10, in accordance with many embodiments. The additional illustrated components include the first RF antenna 18, the second RF antenna 22, the third RF antenna 26, an RF transceiver 42, and a management module 115. The RF transceiver 42 is operatively coupled with each of the RF antennas 18, 22, 26 and outputs signals to the RF antennas 18, 22, 26 that are converted by the RF antennas 18, 22, 26 into the RF interrogation signals 16, 20, 24. The management module 115 is operatively coupled with the RF transceiver 42 and controls timing of the RF interrogation signals 16, 20, 24. The RF antennas 18, 22, 26 receive the RF response signals and output corresponding signals to the RF transceiver 42, which outputs one or more signals to the management module 115 indicative of the timing of the receipt of the RF response signals by the RF antennas 18, 22, 26.

In many embodiments, the management module 115 processes the respective time of flights of the RF interrogation signals 16, 20, 24 and the respective RF response signals to determine and track location of the user-wearable unit(s) 12. For example, the management module 115 can store data defining respective spatial regions corresponding to each of the inventory bins 19 and evaluate the determined locations of the user-wearable unit(s) 12 to assess whether the determined location is located within any of the respective spatial regions. If the determined location is found to be within any of the respective spatial regions, the management module 115 can be configured to determine that the worker 14 is interacting with the inventory bin 19 corresponding to the respective spatial region. In many embodiments, the management module 115 is configured to evaluate whether the identified inventory bin 19 matches the designated inventory bin (C2), or matches an inventory bin 19 other than the designated inventory bin (C2). In many embodiments, the management module 115 is configured to communicate with the user-wearable unit(s) 12 via a suitable communication mechanism such as those described herein, to indicate, upon occurrence, that the worker 14 is interacting with the designated inventory bin (C2) and, upon occurrence, that the worker 14 is interacting with an inventory bin 19 other than the designated inventory bin (C2).

Figure 4:
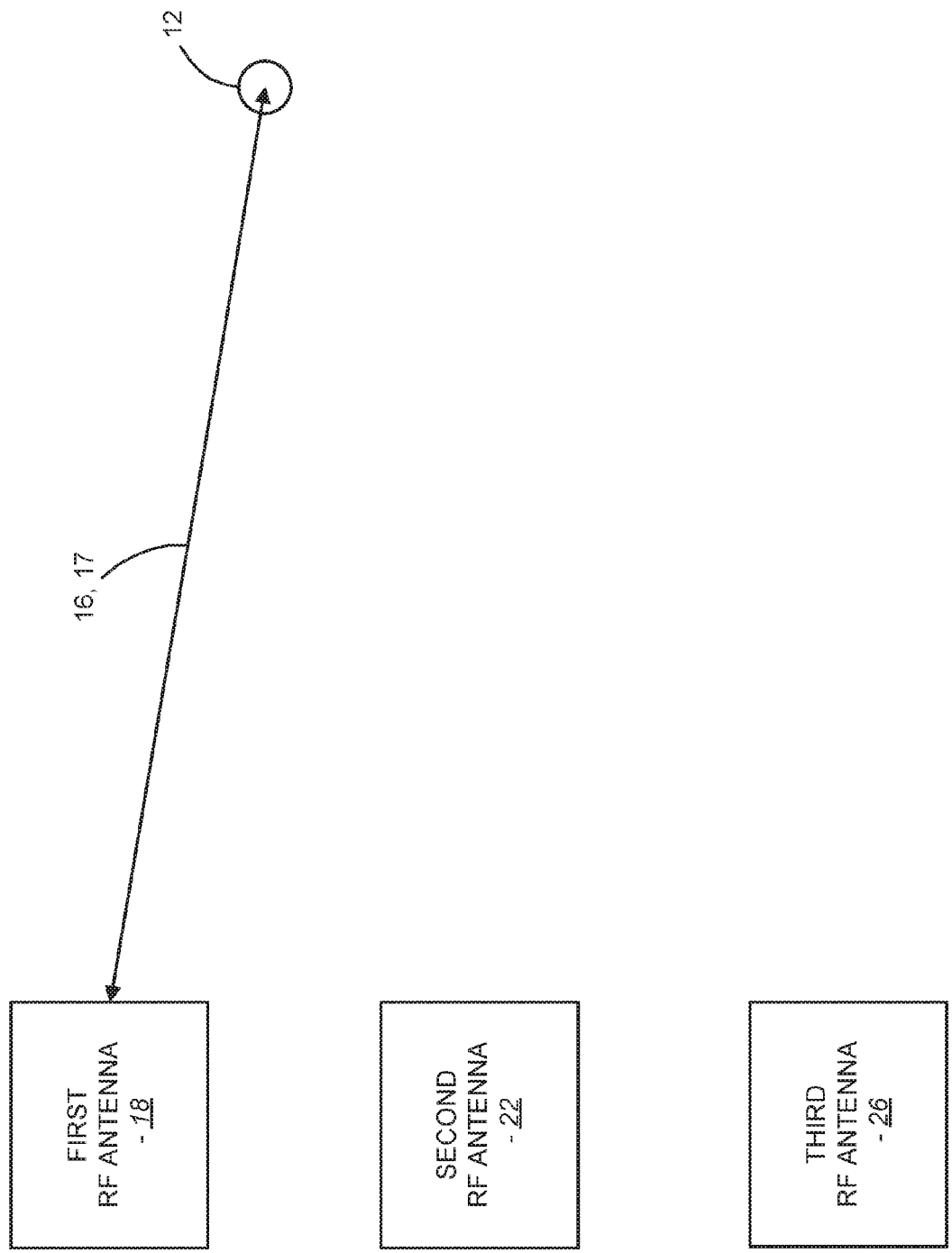
FIG. 4 through FIG. 6 schematically illustrate an approach for determining the location of a user-wearable unit based on time of flight of interrogation signals from and back to respective RF antennas, in accordance with many embodiments.
Figure 5:
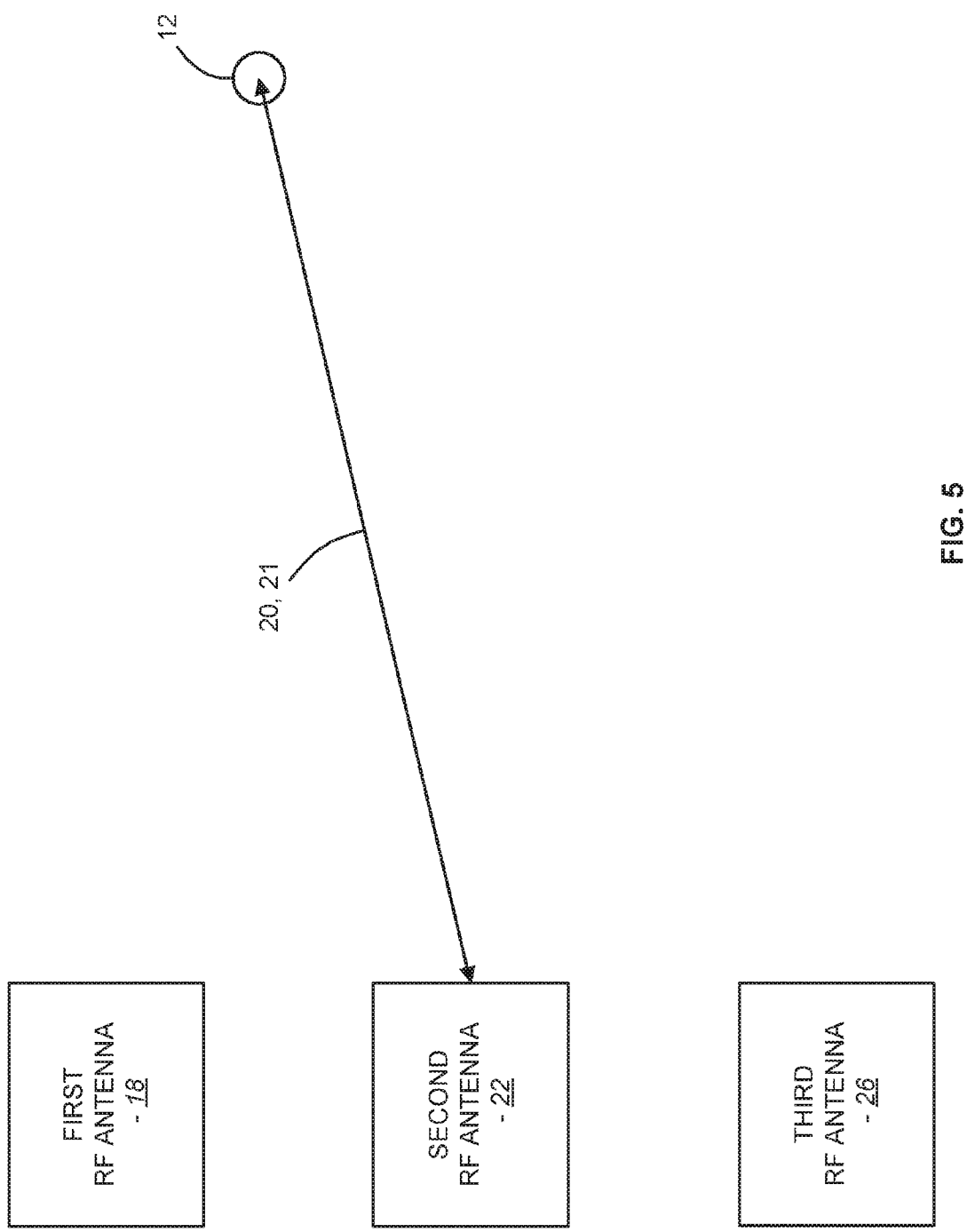
Figure 6:
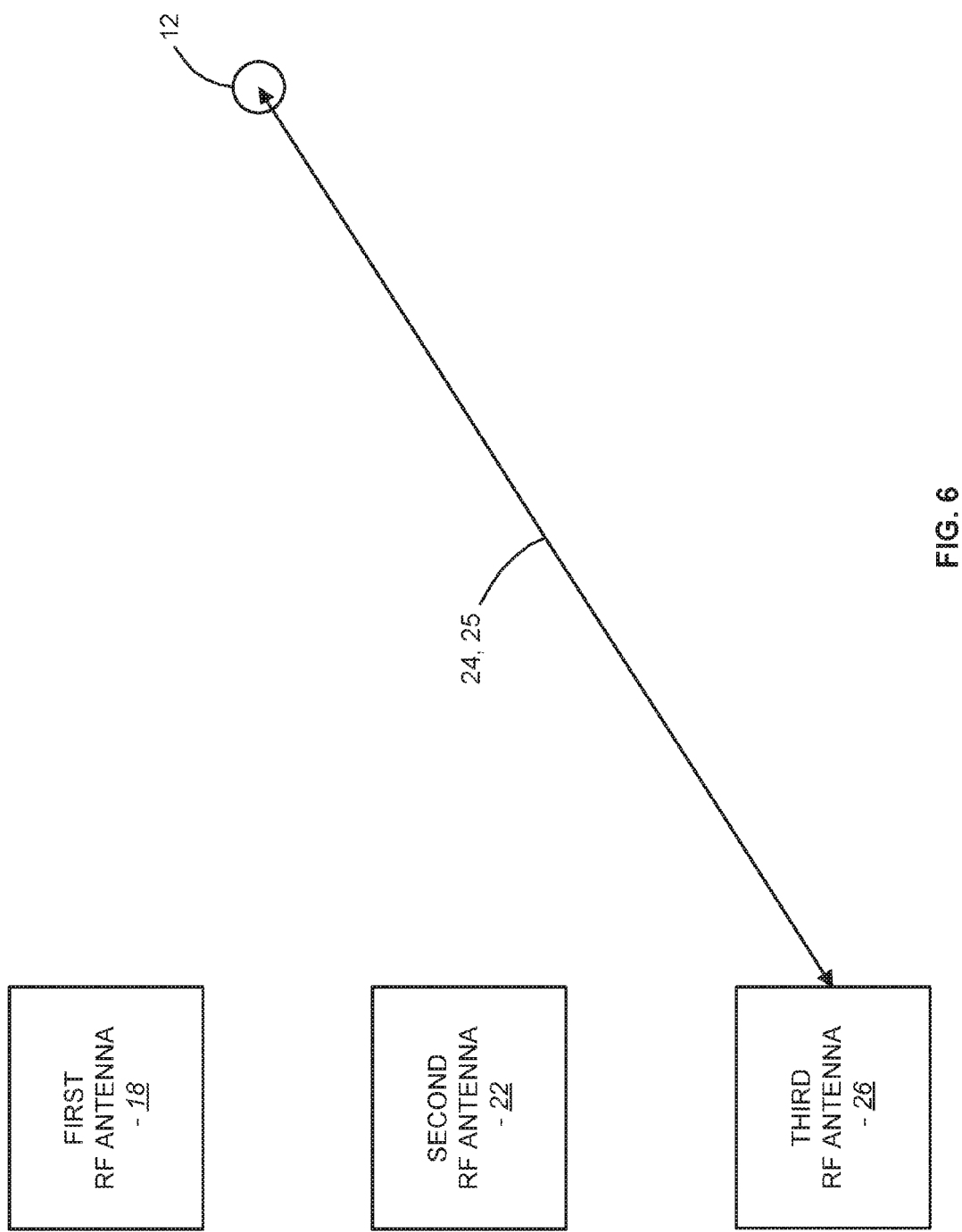

FIG. 4 through FIG. 6 schematically illustrate an approach for determining the location of a user-wearable unit based on time of flight of interrogation signals from and back to respective RF antennas, in accordance with many embodiments. FIG. 4 depicts a first RF interrogation signal 16 transmitted from the first RF antenna 18 at a first time point (t1). The first RF interrogation signal 16 is thereafter received by the user-wearable unit 12, which transmits a first RF response signal 17 in response to the reception of the first RF interrogation signal 16. The first RF response signal 17 is then received by the first RF antenna 18 at a second time point (t2). The time period between the first time point (t1) and the second time point (t2) is used to determine a first distance (d1) between the first RF antenna 18 and the user-wearable unit 12 (e.g., via a lookup table). In a similar manner, FIG. 5 depicts a second RF interrogation signal 20 transmitted from the second RF antenna 22 at a third time point (t3), for example, a suitable time span after the second time point (t2). The second RF interrogation signal 20 is thereafter received by the user-wearable unit 12, which transmits a second RF response signal 21 in response to the reception of the second RF interrogation signal 20. The second RF response signal 21 is then received by the second RF antenna 22 at a fourth time point (t4). The time period between the third time point (t3) and the fourth time point (t4) is used to determine a second distance (d2) between the second RF antenna 22 and the user-wearable unit 12. In a similar manner, FIG. 6 depicts a third RF interrogation signal 24 transmitted from the third RF antenna 26 at a fifth time point (t5), for example, a suitable time span after the fourth time point (t4). The third RF interrogation signal 24 is thereafter received by the user-wearable unit 12, which transmits a third RF response signal 25 in response to the reception of the third RF interrogation signal 24. The third RF response signal 25 is then received by the third RF antenna 26 at a sixth time point (t6). The time period between the fifth time point (t5) and the sixth time point (t6) is used to determine a third distance (d3) between the third RF antenna 26 and the user-wearable unit 12. In many embodiments, the time span between the first time point (t1) and the sixth time point (t6) is sufficiently short to ensure that the user-wearable unit 12 has not moved significantly. The three distances (d1, d2, d3) can be used to determine the location of the user-wearable unit 12 based on known locations of the RF antennas 18, 22, 26.

Figure 7:
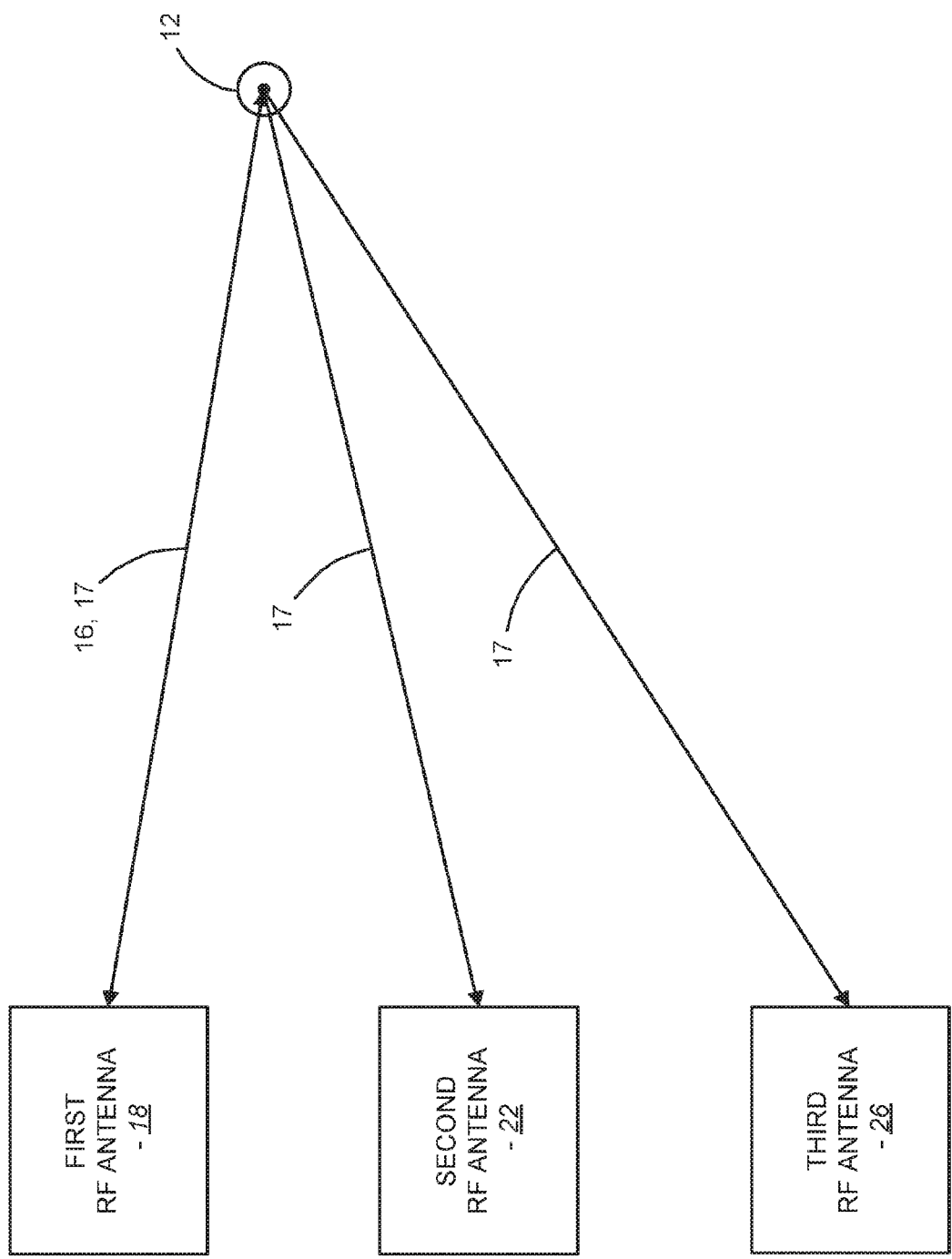
FIG. 7 schematically illustrates an alternate approach for determining the location of a user-wearable unit based on time of flight of an interrogation signal from a single RF antenna and resulting RF response signals back to three RF antennas, in accordance with many embodiments.

FIG. 7 schematically illustrates an alternate approach for determining the location of a user-wearable unit based on time of flight of an interrogation signal from a single RF antenna and resulting RF response signals back to three RF antennas, in accordance with many embodiments. At a first time point (t1), a first RF interrogation signal 16 is transmitted from the first RF antenna 18 at a first time point (t1). The first RF interrogation signal 16 is thereafter received by the user-wearable unit 12, which transmits a first RF response signal 17 in response to the reception of the first RF interrogation signal 16. The first RF response signal 17 is then received by the first RF antenna 18 at a second time point (t2). The time period between the first time point (t1) and the second time point (t2) is used to determine the first distance (d1) between the first RF antenna 18 and the user-wearable unit 12 (e.g., via a lookup table). The first RF response signal 17 is also received by the second RF antenna 22 at a third time point (t3). The first, second, and third time points (t1, t2, t3) can be used to determine the distance (d2) between the second RF antenna 22 and the user-wearable unit 12. The first RF response signal 17 is also received by the third RF antenna 26 at a fourth time point (t4). The first, second and fourth time points (t1, t2, t4) can be used to determine the distance (d3) between the third RF antenna 26 and the user-wearable unit 12. The three distances (d1, d2, d3) can be used to determine the location of the user-wearable unit 12 based on known locations of the RF antennas 18, 22, 26. Any suitable combination or variation of the approaches described herein (based on time of flight of one or more interrogation signals from and back to one or more RF antennas) can be employed to determine the location of the user-wearable unit 12.

Figure 8:
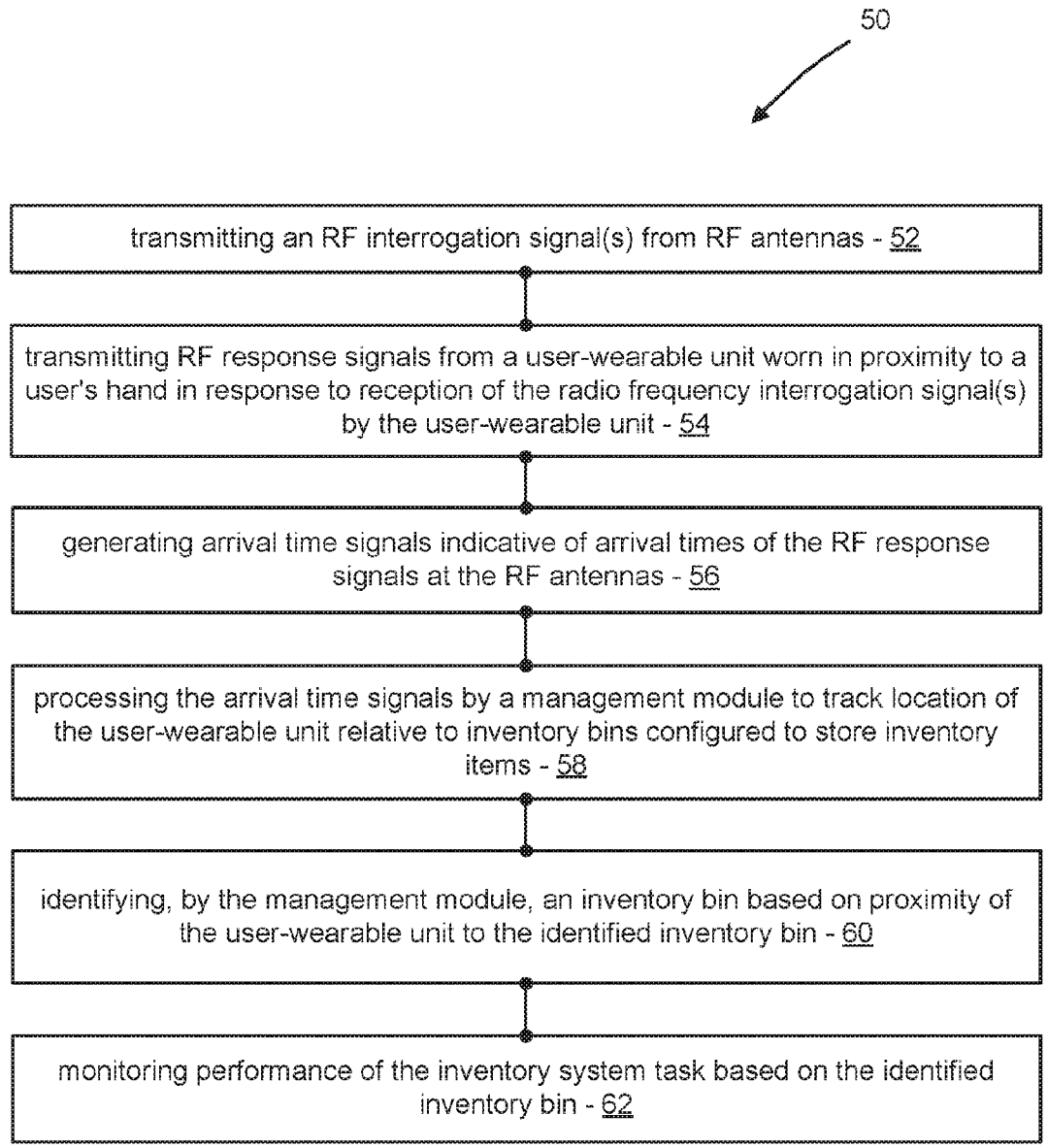
FIG. 8 is a simplified schematic diagram of acts of a computer implemented method of monitoring performance of an inventory system task, in accordance with many embodiments.

FIG. 8 is a simplified schematic diagram of acts of a computer implemented method 50 of monitoring performance of an inventory system task, in accordance with many embodiments. Any suitable RF tracking system can be used to practice the method 50, such as the RF tracking system 10 described herein. The method 50 includes transmitting an RF interrogation signal(s) from RF antennas (act 52). An RF response signal(s) is transmitted from a user-wearable unit(s) worn in proximity to a user's hand in response to reception of the RF interrogation signal(s) by the user-wearable unit(s) (act 54). One or more signals indicative of arrival times of the RF response signal(s) at the RF antennas are generated (act 56). The one or more signals are processed, by a management module, to track location of the user-wearable unit(s) relative to inventory bins configured to store inventory items (act 58). An inventory bin is identified, by the management module, based on proximity of the user-wearable unit to the identified inventory bin (act 60). Performance of the inventory task is monitored based on the identified inventory bin (act 62).

Figure 9:
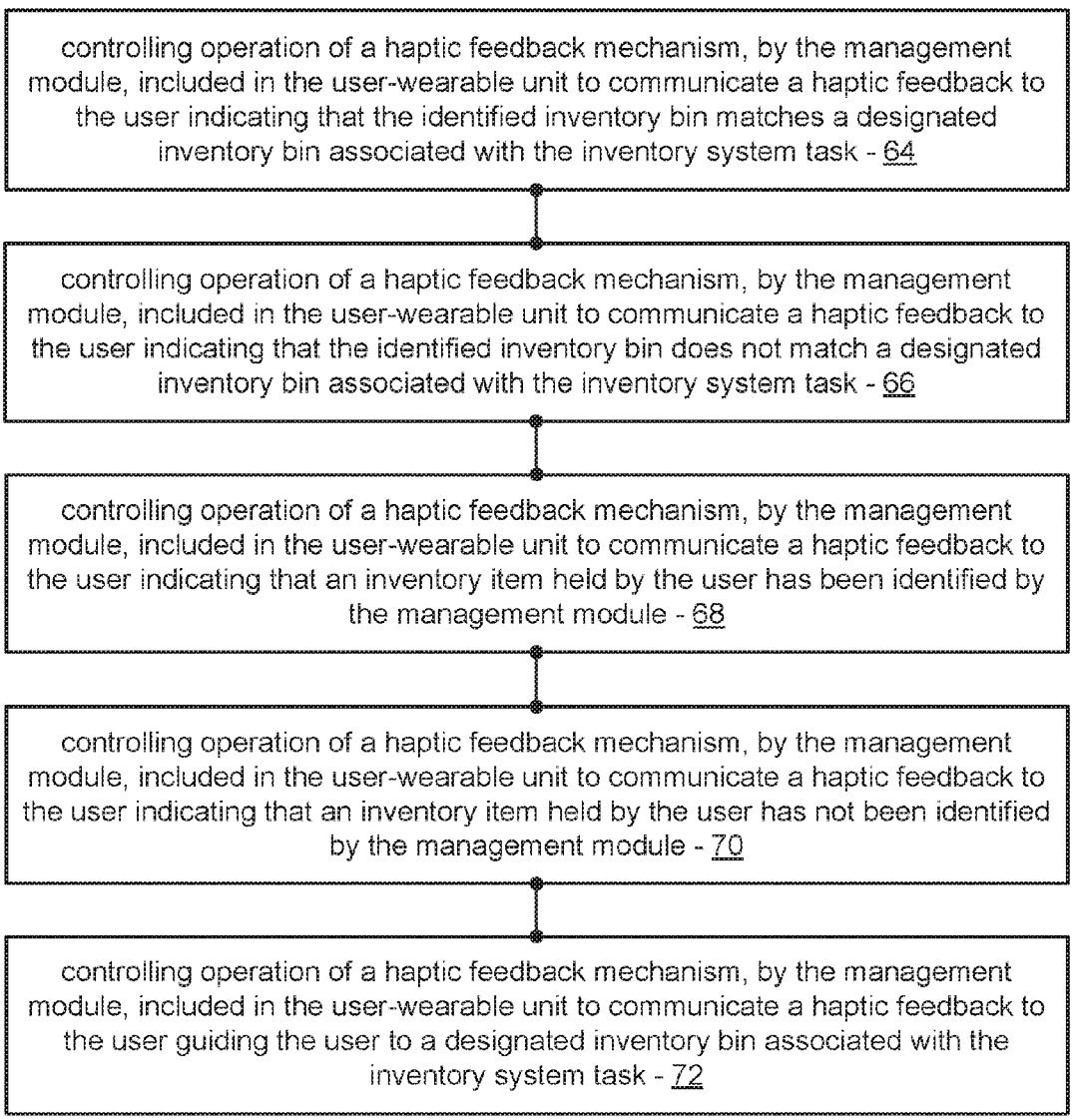
FIG. 9 is a simplified schematic diagram of acts involving haptic feedbacks that can be accomplished in the method of FIG. 8, in accordance with many embodiments.

FIG. 9 is a simplified schematic diagram of acts involving haptic feedbacks that can be optionally accomplished in the method 50, in accordance with many embodiments. The optional acts include controlling operation of a haptic feedback mechanism, by the management module, included in the user-wearable unit to communicate a haptic feedback to the user indicating that the identified inventory bin matches a designated inventory bin associated with the inventory system task (act 64). The haptic feedback mechanism can be controlled by the management module to communicate a haptic feedback to the user indicating that the identified inventory bin does not match a designated inventory bin associated with the inventory system task (act 66). The haptic feedback mechanism can be controlled by the management module to communicate a haptic feedback to the user indicating that an inventory item held by the user has been identified by the management module (act 68). The haptic feedback mechanism can be controlled by the management module to communicate a haptic feedback to the user indicating that an inventory item held by the user has not been identified by the management module (act 70). The haptic feedback mechanism can be controlled by the management module to communicate a haptic feedback to the user guiding the user to a designated inventory bin associated with the inventory system task (act 72).

Figure 10:
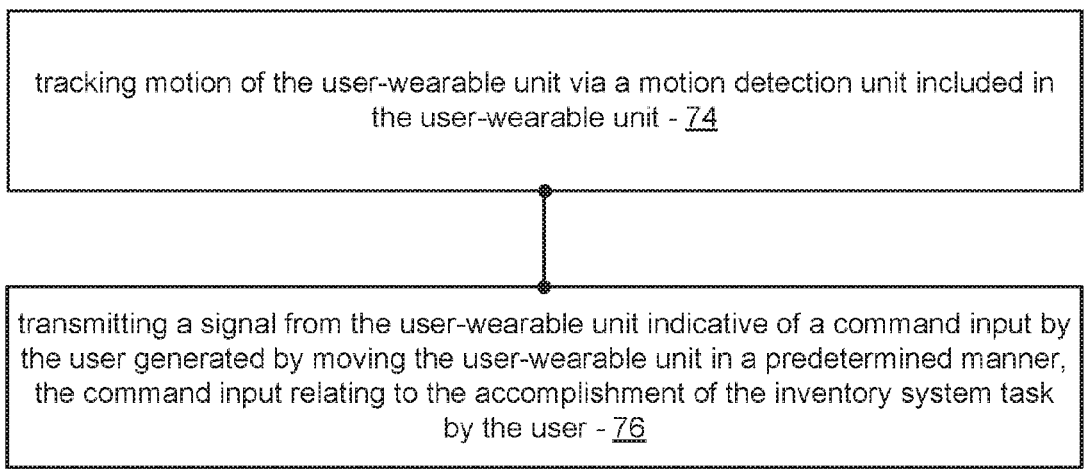
FIG. 10 is a simplified schematic diagram of acts involving generating a user input via a user motion that can be accomplished in the method of FIG. 8, in accordance with many embodiments.
Figure 11:
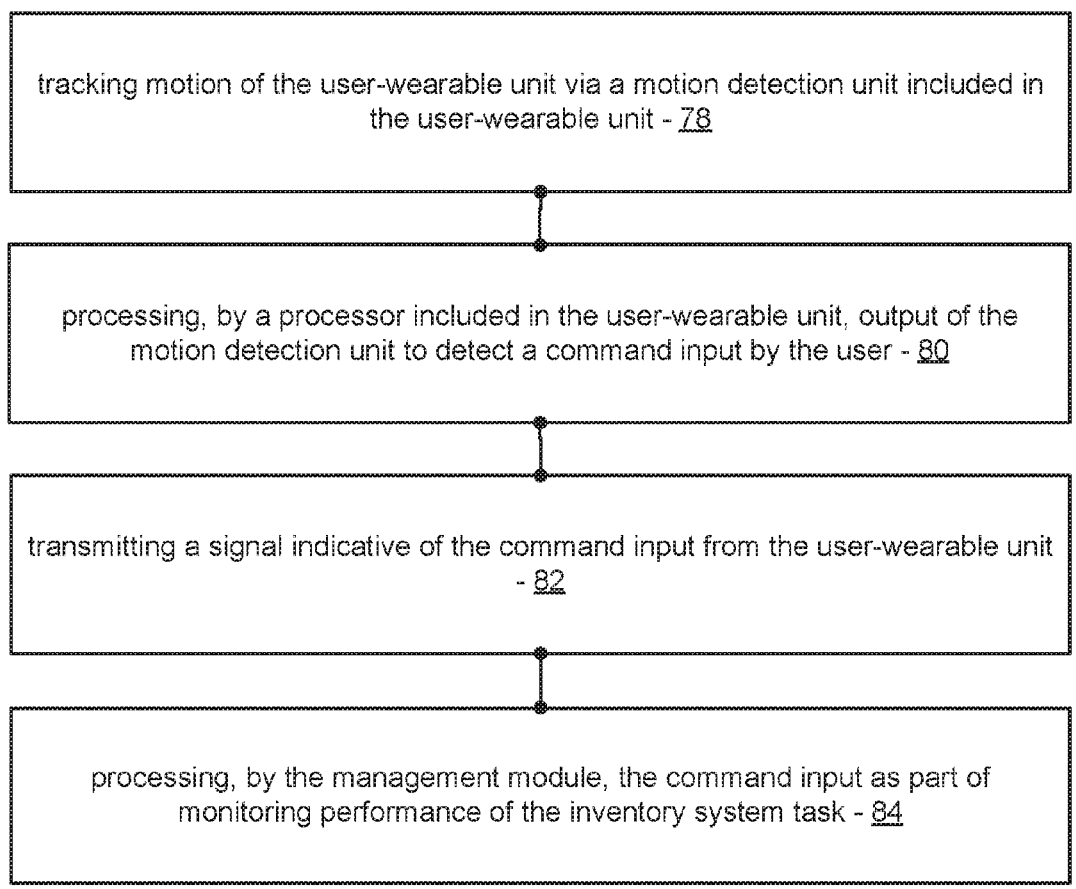
FIG. 11 is a simplified schematic diagram of acts involving generating a user input via a user motion that can be accomplished in the method of FIG. 8, in accordance with many embodiments.

FIG. 10 is a simplified schematic diagram of acts involving generating a user input via a user motion that can be optionally accomplished in the method 50, in accordance with many embodiments. The optional acts include tracking motion of the user-wearable unit via a motion detection unit (e.g., the motion detection unit 36 as described herein) included in the user-wearable unit (act 74). A signal can be transmitted from the user-wearable unit indicative of a command input by the user generated by moving the user-wearable unit in a predetermined manner. For example, the input commands can be generated by any variety or combination of motions, e.g., rotation, vertical or horizontal motion, shaking, acceleration above certain threshold(s), or others, as well as combinations of motions of both hands (i.e., wearable units worn on each hand or wrist). The command input can relate to the accomplishment of the inventory system task by the user (act 76). The motion generated input commands can include any suitable input command from the worker 14, for example, to confirm completion of a task (e.g., item has been placed into a storage location), to override a task instruction (e.g., to override an instruction to place an item into a system designated storage location to allow the worker 14 to place the item into a storage location selected by the worker 14), to override haptic feedback for particular tasks, to indicate picking of an item from a storage location, to indicate placement of an item to a storage location, to indicate other info to the overall system (such as an item to be picked is not present, or a location for placement of item is not available or already full) or any other input commands. FIG. 11 is a simplified schematic diagram of additional acts involving generating a user input via a user motion that can be optionally accomplished in the method of 50, in accordance with many embodiments. The optional acts include tracking motion of the user-wearable unit via a motion detection unit included in the user-wearable unit (act 78). Output of the motion detection unit can be processed, by a processor included in the user-wearable unit, to detect a command input by the user (act 80). A signal indicative of the command input can be transmitted from the user-wearable unit (act 82). The command input can be processed, by the management module, as part of monitoring performance of the inventory system task (act 84).

Example Implementation—Inventory Management System

Figure 12:
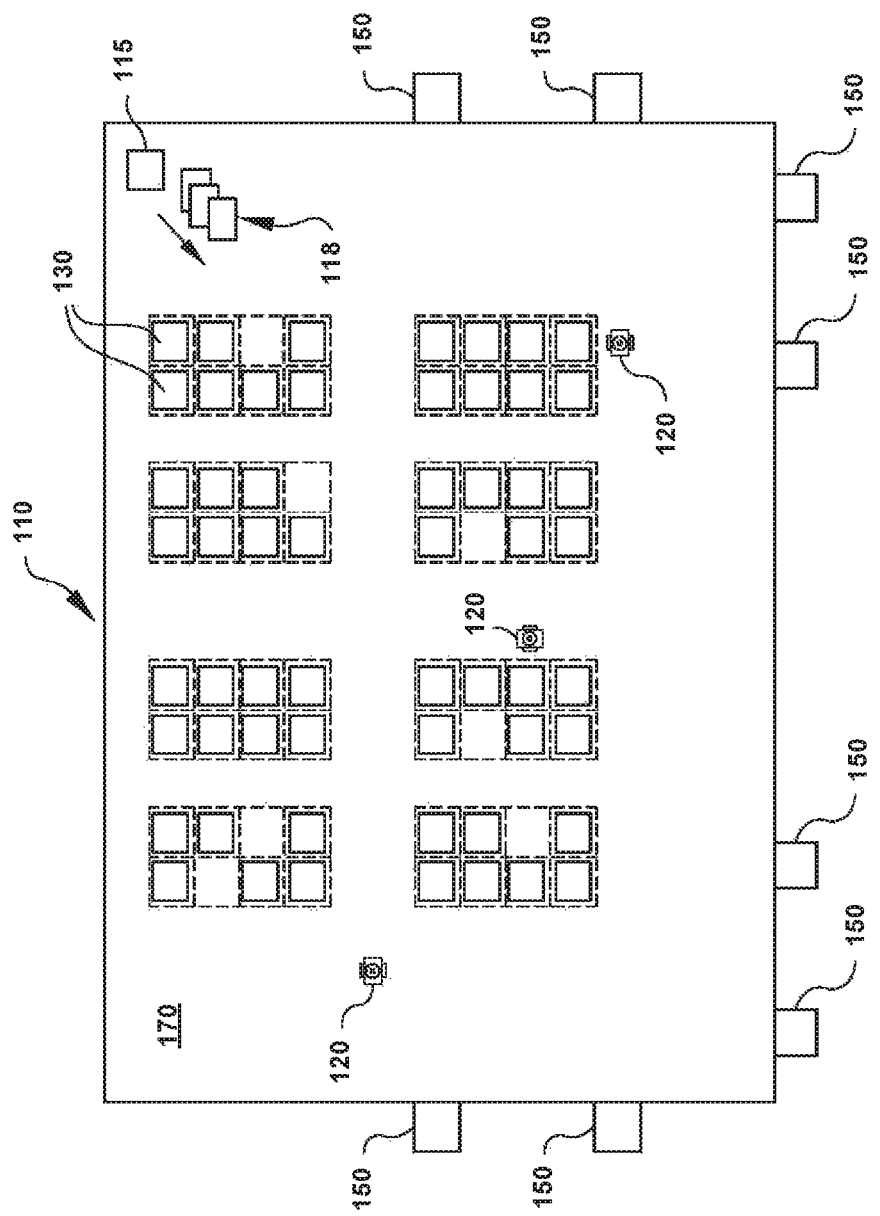
FIG. 12 illustrates components of an inventory system in which an RF tracking system configured to monitor performance of an inventory system task can be implemented, in accordance with many embodiments.

FIG. 12 illustrates the contents of an inventory system 110. Inventory system 110 includes a management module 115, one or more mobile drive units 120, one or more inventory holders 130, and one or more inventory stations 150. Mobile drive units 120 transport inventory holders 130 between points within a workspace 170 in response to commands communicated by management module 115. Each inventory holder 130 stores one or more types of inventory items. As a result, inventory system 110 is capable of moving inventory items between locations within workspace 170 to facilitate the entry, processing, and/or removal of inventory items from inventory system 110 and the completion of other tasks involving inventory items.

Management module 115 assigns tasks to appropriate components of inventory system 110 and coordinates operation of the various components in completing the tasks. These tasks may relate not only to the movement and processing of inventory items, but also to the management and maintenance of the components of inventory system 110. For example, management module 115 may assign portions of workspace 170 as parking spaces for mobile drive units 120, the scheduled recharge or replacement of mobile drive unit batteries, the storage of empty inventory holders 130, or any other operations associated with the functionality supported by inventory system 110 and its various components. Management module 115 may select components of inventory system 110 to perform these tasks and communicate appropriate commands and/or data to the selected components to facilitate completion of these operations. Although shown in FIG. 12 as a single, discrete component, management module 115 may represent multiple components and may represent or include portions of mobile drive units 120 or other elements of inventory system 110. As a result, any or all of the interaction between a particular mobile drive unit 120 and management module 115 that is described below may, in particular embodiments, represent peer-to-peer communication between that mobile drive unit 120 and one or more other mobile drive units 120.

Mobile drive units 120 move inventory holders 130 between locations within workspace 170. Mobile drive units 120 may represent any devices or components appropriate for use in inventory system 110 based on the characteristics and configuration of inventory holders 130 and/or other elements of inventory system 110. In a particular embodiment of inventory system 110, mobile drive units 120 represent independent, self-powered devices configured to freely move about workspace 170. Examples of such inventory systems are disclosed in U.S. Pat. No. 9,087,314, issued Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 120 represent elements of a tracked inventory system configured to move inventory holder 130 along tracks, rails, cables, crane system, or other guidance or support elements traversing workspace 170. In such an embodiment, mobile drive units 120 may receive power and/or support through a connection to the guidance elements, such as a powered rail. Additionally, in particular embodiments of inventory system 110 mobile drive units 120 may be configured to utilize alternative conveyance equipment to move within workspace 170 and/or between separate portions of workspace 170. The contents and operation of an example embodiment of a mobile drive unit 120 are discussed further below with respect to FIGS. 14 through 16.

Additionally, mobile drive units 120 may be capable of communicating with management module 115 to receive information identifying selected inventory holders 130, transmit the locations of mobile drive units 120, or exchange any other suitable information to be used by management module 115 or mobile drive units 120 during operation. Mobile drive units 120 may communicate with management module 115 wirelessly, using wired connections between mobile drive units 120 and management module 115, and/or in any other appropriate manner. As one example, particular embodiments of mobile drive unit 120 may communicate with management module 115 and/or with one another using 802.11, Bluetooth, or Infrared Data Association (IrDA) standards, or any other appropriate wireless communication protocol. As another example, in a tracked inventory system 110, tracks or other guidance elements upon which mobile drive units 120 move may be wired to facilitate communication between mobile drive units 120 and other components of inventory system 110. Furthermore, as noted above, management module 115 may include components of individual mobile drive units 120. Thus, for the purposes of this description and the claims that follow, communication between management module 115 and a particular mobile drive unit 120 may represent communication between components of a particular mobile drive unit 120. In general, mobile drive units 120 may be powered, propelled, and controlled in any manner appropriate based on the configuration and characteristics of inventory system 110.

Inventory holders 130 store inventory items. In a particular embodiment, inventory holders 130 include multiple storage bins with each storage bin capable of holding one or more types of inventory items. Inventory holders 130 are capable of being carried, rolled, and/or otherwise moved by mobile drive units 120. In particular embodiments, inventory holder 130 may provide additional propulsion to supplement that provided by mobile drive unit 120 when moving inventory holder 130.

Additionally, in particular embodiments, inventory items may also hang from hooks or bars (not shown) within or on inventory holder 130. In general, inventory holder 130 may store inventory items in any appropriate manner within inventory holder 130 and/or on the external surface of inventory holder 130.

Additionally, each inventory holder 130 may include a plurality of faces, and each bin may be accessible through one or more faces of the inventory holder 130. For example, in a particular embodiment, inventory holder 130 includes four faces. In such an embodiment, bins located at a corner of two faces may be accessible through either of those two faces, while each of the other bins is accessible through an opening in one of the four faces. Mobile drive unit 120 may be configured to rotate inventory holder 130 at appropriate times to present a particular face and the bins associated with that face to an operator or other components of inventory system 110.

Inventory items represent any objects suitable for storage, retrieval, and/or processing in an automated inventory system 110. For the purposes of this description, "inventory items" may represent any one or more objects of a particular type that are stored in inventory system 110. Thus, a particular inventory holder 130 is currently "storing" a particular inventory item if the inventory holder 130 currently holds one or more units of that type. As one example, inventory system 110 may represent a mail order warehouse facility, and inventory items may represent merchandise stored in the warehouse facility. During operation, mobile drive units 120 may retrieve inventory holders 130 containing one or more inventory items requested in an order to be packed for delivery to a customer or inventory holders 130 carrying pallets containing aggregated collections of inventory items for shipment. Moreover, in particular embodiments of inventory system 110, boxes containing completed orders may themselves represent inventory items.

In particular embodiments, inventory system 110 may also include one or more inventory stations 150. Inventory stations 150 represent locations designated for the completion of particular tasks involving inventory items. Such tasks may include the removal of inventory items from inventory holders 130, the introduction of inventory items into inventory holders 130, the counting of inventory items in inventory holders 130, the decomposition of inventory items (e.g., from pallet- or case-sized groups to individual inventory items), the consolidation of inventory items between inventory holders 130, and/or the processing or handling of inventory items in any other suitable manner. In particular embodiments, inventory stations 150 may just represent the physical locations where a particular task involving inventory items can be completed within workspace 170. In alternative embodiments, inventory stations 150 may represent both the physical location and also any appropriate equipment for processing or handling inventory items, such as scanners for monitoring the flow of inventory items in and out of inventory system 110, communication interfaces for communicating with management module 115, and/or any other suitable components. Inventory stations 150 may be controlled, entirely or in part, by human operators or may be fully automated. Moreover, the human or automated operators of inventory stations 150 may be capable of performing certain tasks to inventory items, such as packing, counting, or transferring inventory items, as part of the operation of inventory system 110.

Workspace 170 represents an area associated with inventory system 110 in which mobile drive units 120 can move and/or inventory holders 130 can be stored. For example, workspace 170 may represent all or part of the floor of a mail-order warehouse in which inventory system 110 operates. In some embodiments, workspace 170 includes multiple floors, and some combination of ramps, elevators, conveyors, and/or other devices are provided to facilitate movement of mobile drive units 120 and/or other components of the inventory system 110 between the multiple floors. Although FIG. 12 shows, for the purposes of illustration, an embodiment of inventory system 110 in which workspace 170 includes a fixed, predetermined, and finite physical space, particular embodiments of inventory system 110 may include mobile drive units 120 and inventory holders 130 that are configured to operate within a workspace 170 that is of variable dimensions and/or an arbitrary geometry. While FIG. 12 illustrates a particular embodiment of inventory system 110 in which workspace 170 is entirely enclosed in a building, alternative embodiments may utilize workspaces 170 in which some or all of the workspace 170 is located outdoors, within a vehicle (such as a cargo ship), or otherwise unconstrained by any fixed structure.

In operation, management module 115 selects appropriate components to complete particular tasks and transmits task assignments 118 to the selected components to trigger completion of the relevant tasks. Each task assignment 118 defines one or more tasks to be completed by a particular component. These tasks may relate to the retrieval, storage, replenishment, and counting of inventory items and/or the management of mobile drive units 120, inventory holders 130, inventory stations 150 and other components of inventory system 110. Depending on the component and the task to be completed, a particular task assignment 118 may identify locations, components, and/or actions associated with the corresponding task and/or any other appropriate information to be used by the relevant component in completing the assigned task.

In particular embodiments, management module 115 generates task assignments 118 based, in part, on inventory requests that management module 115 receives from other components of inventory system 110 and/or from external components in communication with management module 115. These inventory requests identify particular operations to be completed involving inventory items stored or to be stored within inventory system 110 and may represent communication of any suitable form. For example, in particular embodiments, an inventory request may represent a shipping order specifying particular inventory items that have been purchased by a customer and that are to be retrieved from inventory system 110 for shipment to the customer. Management module 115 may also generate task assignments 118 independently of such inventory requests, as part of the overall management and maintenance of inventory system 110. For example, management module 115 may generate task assignments 118 in response to the occurrence of a particular event (e.g., in response to a mobile drive unit 120 requesting a space to park), according to a predetermined schedule (e.g., as part of a daily start-up routine), or at any appropriate time based on the configuration and characteristics of inventory system 110. After generating one or more task assignments 118, management module 115 transmits the generated task assignments 118 to appropriate components for completion of the corresponding task. The relevant components then execute their assigned tasks.

With respect to mobile drive units 120 specifically, management module 115 may, in particular embodiments, communicate task assignments 118 to selected mobile drive units 120 that identify one or more destinations for the selected mobile drive units 120. Management module 115 may select a mobile drive unit 120 to assign the relevant task based on the location or state of the selected mobile drive unit 120, an indication that the selected mobile drive unit 120 has completed a previously-assigned task, a predetermined schedule, and/or any other suitable consideration. These destinations may be associated with an inventory request the management module 115 is executing or a management objective the management module 115 is attempting to fulfill. For example, the task assignment may define the location of an inventory holder 130 to be retrieved, an inventory station 150 to be visited, a storage location where the mobile drive unit 120 should park until receiving another task, or a location associated with any other task appropriate based on the configuration, characteristics, and/or state of inventory system 110, as a whole, or individual components of inventory system 110. For example, in particular embodiments, such decisions may be based on the popularity of particular inventory items, the staffing of a particular inventory station 150, the tasks currently assigned to a particular mobile drive unit 120, and/or any other appropriate considerations.

As part of completing these tasks mobile drive units 120 may dock with and transport inventory holders 130 within workspace 170. Mobile drive units 120 may dock with inventory holders 130 by connecting to, lifting, and/or otherwise interacting with inventory holders 130 in any other suitable manner so that, when docked, mobile drive units 120 are coupled to and/or support inventory holders 130 and can move inventory holders 130 within workspace 170. While the description below focuses on particular embodiments of mobile drive unit 120 and inventory holder 130 that are configured to dock in a particular manner, alternative embodiments of mobile drive unit 120 and inventory holder 130 may be configured to dock in any manner suitable to allow mobile drive unit 120 to move inventory holder 130 within workspace 170. Additionally, as noted below, in particular embodiments, mobile drive units 120 represent all or portions of inventory holders 130. In such embodiments, mobile drive units 120 may not dock with inventory holders 130 before transporting inventory holders 130 and/or mobile drive units 120 may each remain continually docked with a particular inventory holder 130.

While the appropriate components of inventory system 110 complete assigned tasks, management module 115 may interact with the relevant components to ensure the efficient use of space, equipment, manpower, and other resources available to inventory system 110. As one specific example of such interaction, management module 115 is responsible, in particular embodiments, for planning the paths mobile drive units 120 take when moving within workspace 170 and for allocating use of a particular portion of workspace 170 to a particular mobile drive unit 120 for purposes of completing an assigned task. In such embodiments, mobile drive units 120 may, in response to being assigned a task, request a path to a particular destination associated with the task. Moreover, while the description below focuses on one or more embodiments in which mobile drive unit 120 requests paths from management module 115, mobile drive unit 120 may, in alternative embodiments, generate its own paths.

Components of inventory system 110 may provide information to management module 115 regarding their current state, other components of inventory system 110 with which they are interacting, and/or other conditions relevant to the operation of inventory system 110. This may allow management module 115 to utilize feedback from the relevant components to update algorithm parameters, adjust policies, or otherwise modify its decision-making to respond to changes in operating conditions or the occurrence of particular events.

In addition, while management module 115 may be configured to manage various aspects of the operation of the components of inventory system 110, in particular embodiments, the components themselves may also be responsible for decision-making relating to certain aspects of their operation, thereby reducing the processing load on management module 115.

Thus, based on its knowledge of the location, current state, and/or other characteristics of the various components of inventory system 110 and an awareness of all the tasks currently being completed, management module 115 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 110 may be able to support a number of techniques for efficiently executing various aspects of the operation of inventory system 110. As a result, particular embodiments of management module 115 may, by implementing one or more management techniques described below, enhance the efficiency of inventory system 110 and/or provide other operational benefits.

Figure 13:
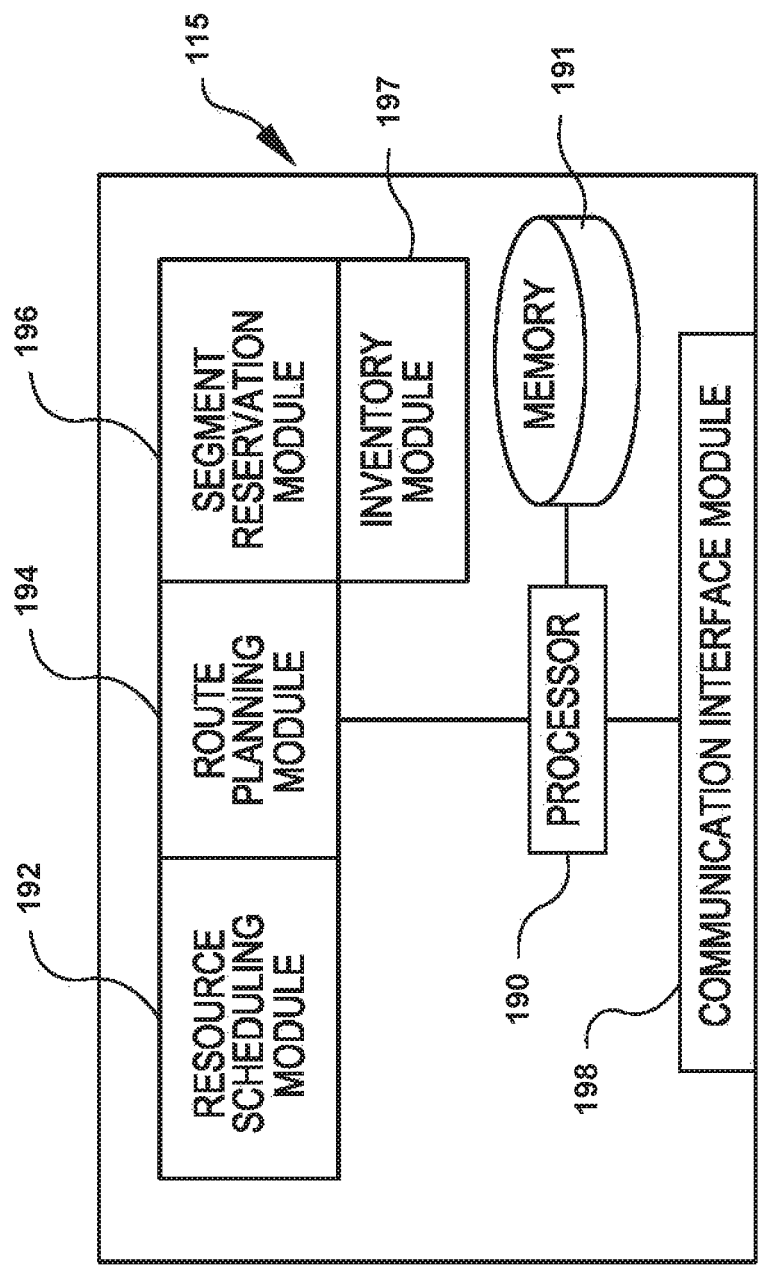
FIG. 13 illustrates components of an example management module that can be employed in the inventory system shown in FIG. 12.

FIG. 13 illustrates in greater detail the components of a particular embodiment of management module 115. As shown, the example embodiment includes a resource scheduling module 192, a route planning module 194, a segment reservation module 196, an inventory module 197, a communication interface module 198, a processor 190, and a memory 191. Management module 115 may represent a single component, multiple components located at a central location within inventory system 110, or multiple components distributed throughout inventory system 110. For example, management module 115 may represent components of one or more mobile drive units 120 that are capable of communicating information between the mobile drive units 120 and coordinating the movement of mobile drive units 120 within workspace 170. In general, management module 115 may include any appropriate combination of hardware and/or software suitable to provide the described functionality.

Processor 190 is operable to execute instructions associated with the functionality provided by management module 115. Processor 190 may comprise one or more general purpose computers, dedicated microprocessors, or other processing devices capable of communicating electronic information. Examples of processor 190 include one or more application-specific integrated circuits (ASICs), field programmable gate arrays (FPGAs), digital signal processors (DSPs) and any other suitable specific or general purpose processors.

Memory 191 stores processor instructions, inventory requests, reservation information, state information for the various components of inventory system 110 and/or any other appropriate values, parameters, or information utilized by management module 115 during operation. Memory 191 may represent any collection and arrangement of volatile or nonvolatile, local or remote devices suitable for storing data. Examples of memory 191 include, but are not limited to, random access memory (RAM) devices, read only memory (ROM) devices, magnetic storage devices, optical storage devices, or any other suitable data storage devices.

Resource scheduling module 192 processes received inventory requests and generates one or more assigned tasks to be completed by the components of inventory system 110. Resource scheduling module 192 may also select one or more appropriate components for completing the assigned tasks and, using communication interface module 198, communicate the assigned tasks to the relevant components. Additionally, resource scheduling module 192 may also be responsible for generating assigned tasks associated with various management operations, such as prompting mobile drive units 120 to recharge batteries or have batteries replaced, instructing inactive mobile drive units 120 to park in a location outside the anticipated traffic flow or a location near the anticipated site of future tasks, and/or directing mobile drive units 120 selected for repair or maintenance to move towards a designated maintenance station.

Route planning module 194 receives route requests from mobile drive units 120. These route requests identify one or more destinations associated with a task the requesting mobile drive unit 120 is executing. In response to receiving a route request, route planning module 194 generates a path to one or more destinations identified in the route request. Route planning module 194 may implement any appropriate algorithms utilizing any appropriate parameters, factors, and/or considerations to determine the appropriate path. After generating an appropriate path, route planning module 194 transmits a route response identifying the generated path to the requesting mobile drive unit 120 using communication interface module 198.

Segment reservation module 196 receives reservation requests from mobile drive units 120 attempting to move along paths generated by route planning module 194. These reservation requests request the use of a particular portion of workspace 170 (referred to herein as a "segment") to allow the requesting mobile drive unit 120 to avoid collisions with other mobile drive units 120 while moving across the reserved segment. In response to received reservation requests, segment reservation module 196 transmits a reservation response granting or denying the reservation request to the requesting mobile drive unit 120 using the communication interface module 198.

The inventory module 197 maintains information about the location and number of inventory items in the inventory system 110. Information can be maintained about the number of inventory items in a particular inventory holder 130, and the maintained information can include the location of those inventory items in the inventory holder 130. The inventory module 197 can also communicate with the mobile drive units 120, utilizing task assignments 118 to maintain, replenish, or move inventory items within the inventory system 110.

Communication interface module 198 facilitates communication between management module 115 and other components of inventory system 110, including reservation responses, reservation requests, route requests, route responses, and task assignments. These reservation responses, reservation requests, route requests, route responses, and task assignments may represent communication of any form appropriate based on the capabilities of management module 115 and may include any suitable information. Depending on the configuration of management module 115, communication interface module 198 may be responsible for facilitating either or both of wired and wireless communication between management module 115 and the various components of inventory system 110. In particular embodiments, management module 115 may communicate using communication protocols such as 802.11, Bluetooth, or Infrared Data Association (IrDA) standards. Furthermore, management module 115 may, in particular embodiments, represent a portion of mobile drive unit 120 or other components of inventory system 110. In such embodiments, communication interface module 198 may facilitate communication between management module 115 and other parts of the same system component.

In general, resource scheduling module 192, route planning module 194, segment reservation module 196, inventory module 197, and communication interface module 198 may each represent any appropriate hardware and/or software suitable to provide the described functionality. In addition, as noted above, management module 115 may, in particular embodiments, represent multiple different discrete components and any or all of resource scheduling module 192, route planning module 194, segment reservation module 196, inventory module 197, and communication interface module 198 may represent components physically separate from the remaining elements of management module 115. Moreover, any two or more of resource scheduling module 192, route planning module 194, segment reservation module 196, inventory module 197, and communication interface module 198 may share common components. For example, in particular embodiments, resource scheduling module 192, route planning module 194, segment reservation module 196, and inventory module 197 represent computer processes executing on processor 190 and communication interface module 198 comprises a wireless transmitter, a wireless receiver, and a related computer process executing on processor 190.

Figure 14:
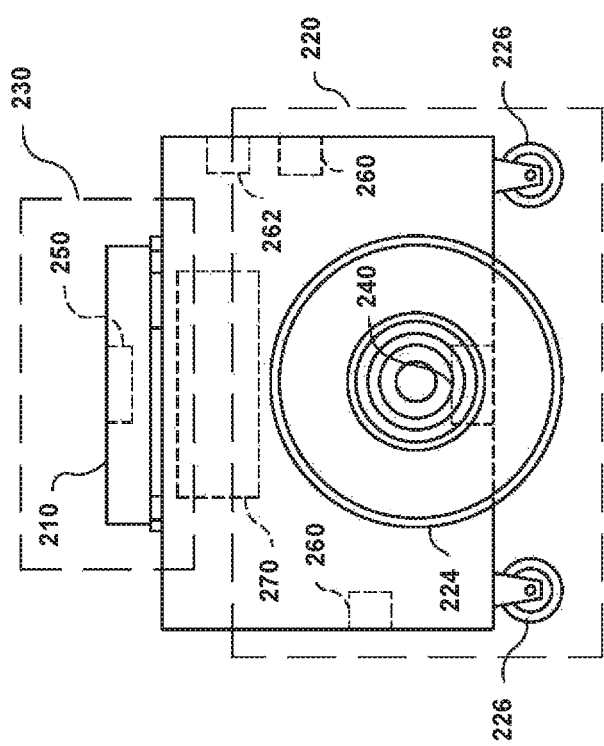
FIGS. 14 and 15 illustrate an example mobile drive unit that can be employed in the inventory system shown in FIG. 12.
Figure 15:
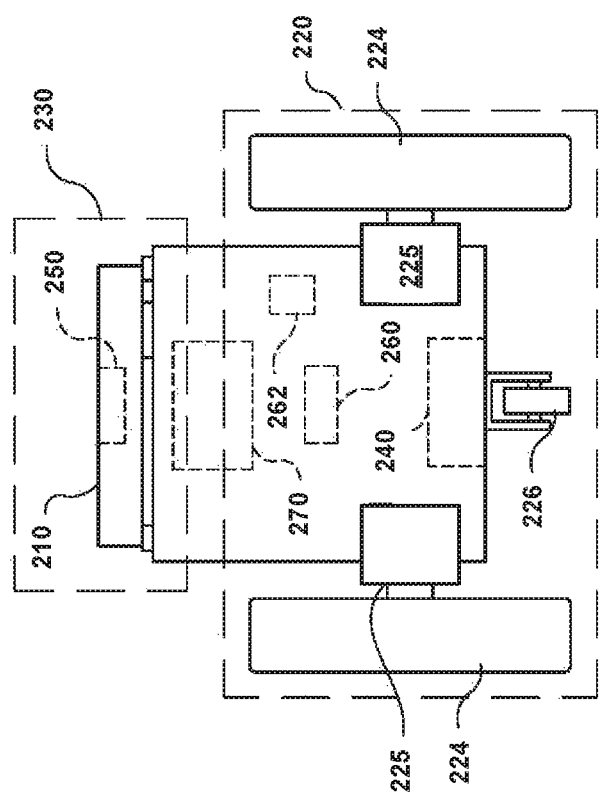
Figure 16:
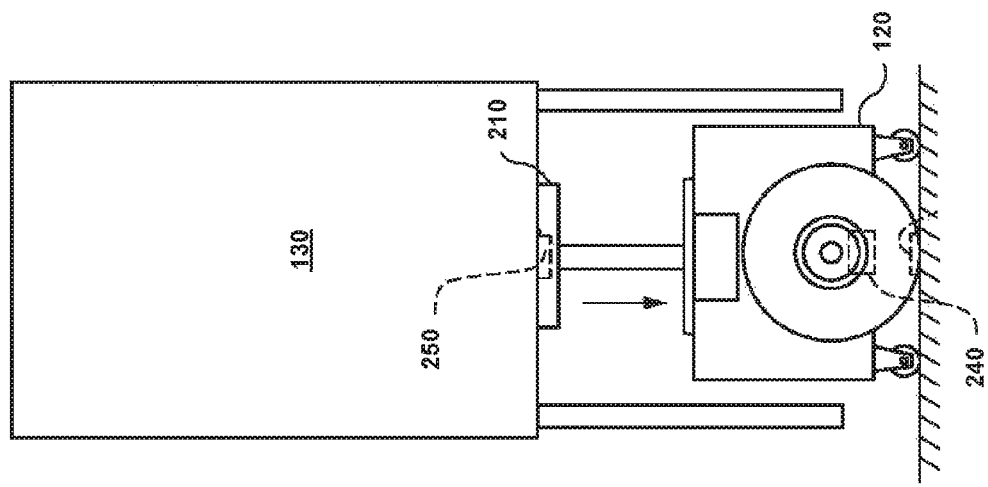
FIG. 16 illustrates an example inventory holder that can be utilized in the inventory system shown in FIG. 12.

FIGS. 14 through 16 illustrate in greater detail the components of a particular embodiment of mobile drive unit 120. In particular, FIGS. 14 through 16 include a front and side view of an example mobile drive unit 120. Mobile drive unit 20 includes a docking head 210, a drive module 220, a docking actuator 230, and a control module 270. Additionally, mobile drive unit 120 may include one or more sensors configured to detect or determine the location of mobile drive unit 120, inventory holder 130, and/or other appropriate elements of inventory system 110. In the illustrated embodiment, mobile drive unit 120 includes a position sensor 240, a holder sensor 250, an obstacle sensor 260, and an identification signal transmitter 262.

Docking head 210, in particular embodiments of mobile drive unit 120, couples mobile drive unit 120 to inventory holder 130 and/or supports inventory holder 130 when mobile drive unit 120 is docked to inventory holder 130. Docking head 210 may additionally allow mobile drive unit 120 to maneuver inventory holder 130, such as by lifting inventory holder 130, propelling inventory holder 130, rotating inventory holder 130, and/or moving inventory holder 130 in any other appropriate manner. Docking head 210 may also include any appropriate combination of components, such as ribs, spikes, and/or corrugations, to facilitate such manipulation of inventory holder 130. For example, in particular embodiments, docking head 210 may include a high-friction portion that abuts a portion of inventory holder 130 while mobile drive unit 120 is docked to inventory holder 130. In such embodiments, frictional forces created between the high-friction portion of docking head 210 and a surface of inventory holder 130 may induce translational and rotational movement in inventory holder 130 when docking head 210 moves and rotates, respectively. As a result, mobile drive unit 120 may be able to manipulate inventory holder 130 by moving or rotating docking head 210, either independently or as a part of the movement of mobile drive unit 120 as a whole.

Drive module 220 propels mobile drive unit 120 and, when mobile drive unit 120 and inventory holder 130 are docked, inventory holder 130. Drive module 220 may represent any appropriate collection of components operable to propel mobile drive unit 120. For example, in the illustrated embodiment, drive module 220 includes a pair of motorized wheels 224, and a pair of stabilizing wheels 226. One motorized wheel 224 is located on each side of the mobile drive unit 20, and one stabilizing wheel 226 is positioned at each end of mobile drive unit 120. Each of the motorized wheels 224 is driven via an associated drive unit 225.

Docking actuator 230 moves docking head 210 towards inventory holder 130 to facilitate docking of mobile drive unit 120 and inventory holder 130. Docking actuator 230 may also be capable of adjusting the position or orientation of docking head 210 in other suitable manners to facilitate docking. Docking actuator 230 may include any appropriate components, based on the configuration of mobile drive unit 120 and inventory holder 130, for moving docking head 210 or otherwise adjusting the position or orientation of docking head 210. For example, in the illustrated embodiment, docking actuator 230 includes a motorized shaft (not shown) attached to the center of docking head 210. The motorized shaft is operable to lift docking head 210 as appropriate for docking with inventory holder 130.

Drive module 220 may be configured to propel mobile drive unit 120 in any appropriate manner. For example, in the illustrated embodiment, motorized wheels 224 are operable to rotate in a first direction to propel mobile drive unit 120 in a forward direction. Motorized wheels 224 are also operable to rotate in a second direction to propel mobile drive unit 120 in a backward direction. In the illustrated embodiment, drive module 220 is also configured to rotate mobile drive unit 120 by rotating motorized wheels 224 in different directions from one another or by rotating motorized wheels 224 at different speed from one another.

Position sensor 240 represents one or more sensors, detectors, or other components suitable for determining the location of mobile drive unit 120 in any appropriate manner. For example, in particular embodiments, the workspace 170 associated with inventory system 110 includes a number of fiducial marks that mark points on a two-dimensional grid that covers all or a portion of workspace 170. In such embodiments, position sensor 240 may include a camera and suitable image- and/or video-processing components, such as an appropriately-programmed digital signal processor, to allow position sensor 240 to detect fiducial marks within the camera's field of view. Control module 270 may store location information that position sensor 240 updates as position sensor 240 detects fiducial marks. As a result, position sensor 240 may utilize fiducial marks to maintain an accurate indication of the location mobile drive unit 120 and to aid in navigation when moving within workspace 170.

Holder sensor 250 represents one or more sensors, detectors, or other components suitable for detecting inventory holder 130 and/or determining, in any appropriate manner, the location of inventory holder 130, as an absolute location or as a position relative to mobile drive unit 120. Holder sensor 250 may be capable of detecting the location of a particular portion of inventory holder 130 or inventory holder 130 as a whole. Mobile drive unit 120 may then use the detected information for docking with or otherwise interacting with inventory holder 130.

Obstacle sensor 260 represents one or more sensors capable of detecting objects located in one or more different directions in which mobile drive unit 120 is capable of moving. Obstacle sensor 260 may utilize any appropriate components and techniques, including optical, radar, sonar, pressure-sensing and/or other types of detection devices appropriate to detect objects located in the direction of travel of mobile drive unit 120. In particular embodiments, obstacle sensor 260 may transmit information describing objects it detects to control module 270 to be used by control module 270 to identify obstacles and to take appropriate remedial actions to prevent mobile drive unit 120 from colliding with obstacles and/or other objects.

Obstacle sensor 260 may also detect signals transmitted by other mobile drive units 120 operating in the vicinity of the illustrated mobile drive unit 120. For example, in particular embodiments of inventory system 110, one or more mobile drive units 120 may include an identification signal transmitter 262 that transmits a drive identification signal. The drive identification signal indicates to other mobile drive units 120 that the object transmitting the drive identification signal is in fact a mobile drive unit. Identification signal transmitter 262 may be capable of transmitting infrared, ultraviolet, audio, visible light, radio, and/or other suitable signals that indicate to recipients that the transmitting device is a mobile drive unit 120.

Additionally, in particular embodiments, obstacle sensor 260 may also be capable of detecting state information transmitted by other mobile drive units 120. For example, in particular embodiments, identification signal transmitter 262 may be capable of including state information relating to mobile drive unit 120 in the transmitted identification signal. This state information may include, but is not limited to, the position, velocity, direction, and the braking capabilities of the transmitting mobile drive unit 120. In particular embodiments, mobile drive unit 120 may use the state information transmitted by other mobile drive units to avoid collisions when operating in close proximity with those other mobile drive units.

Control module 270 monitors and/or controls operation of drive module 220 and docking actuator 230. Control module 270 may also receive information from sensors such as position sensor 240 and holder sensor 250 and adjust the operation of drive module 220, docking actuator 230, and/or other components of mobile drive unit 120 based on this information. Additionally, in particular embodiments, mobile drive unit 120 may be configured to communicate with a management device of inventory system 110 and control module 270 may receive commands transmitted to mobile drive unit 120 and communicate information back to the management device utilizing appropriate communication components of mobile drive unit 120. Control module 270 may include any appropriate hardware and/or software suitable to provide the described functionality. In particular embodiments, control module 270 includes a general-purpose microprocessor programmed to provide the described functionality. Additionally, control module 270 may include all or portions of docking actuator 230, drive module 220, position sensor 240, and/or holder sensor 250, and/or share components with any of these elements of mobile drive unit 120.

Moreover, in particular embodiments, control module 270 may include hardware and software located in components that are physically distinct from the device that houses drive module 220, docking actuator 230, and/or the other components of mobile drive unit 120 described above. For example, in particular embodiments, each mobile drive unit 120 operating in inventory system 110 may be associated with a software process (referred to here as a "drive agent") operating on a server that is in communication with the device that houses drive module 220, docking actuator 230, and other appropriate components of mobile drive unit 120. This drive agent may be responsible for requesting and receiving tasks, requesting and receiving routes, transmitting state information associated with mobile drive unit 120, and/or otherwise interacting with management module 115 and other components of inventory system 110 on behalf of the device that physically houses drive module 220, docking actuator 230, and the other appropriate components of mobile drive unit 120. As a result, for the purposes of this description and the claims that follow, the term "mobile drive unit" includes software and/or hardware, such as agent processes, that provides the described functionality on behalf of mobile drive unit 120 but that may be located in physically distinct devices from the drive module 220, docking actuator 230, and/or the other components of mobile drive unit 120 described above.

While FIGS. 14 through 16 illustrate a particular embodiment of mobile drive unit 120 containing certain components and configured to operate in a particular manner, mobile drive unit 120 may represent any appropriate component and/or collection of components configured to transport and/or facilitate the transport of inventory holders 130. As another example, mobile drive unit 120 may represent part of an overhead crane system in which one or more crane assemblies are capable of moving within a network of wires or rails to a position suitable to dock with a particular inventory holder 130. After docking with inventory holder 130, the crane assembly may then lift inventory holder 130 and move inventory to another location for purposes of completing an assigned task.

Figure 17:
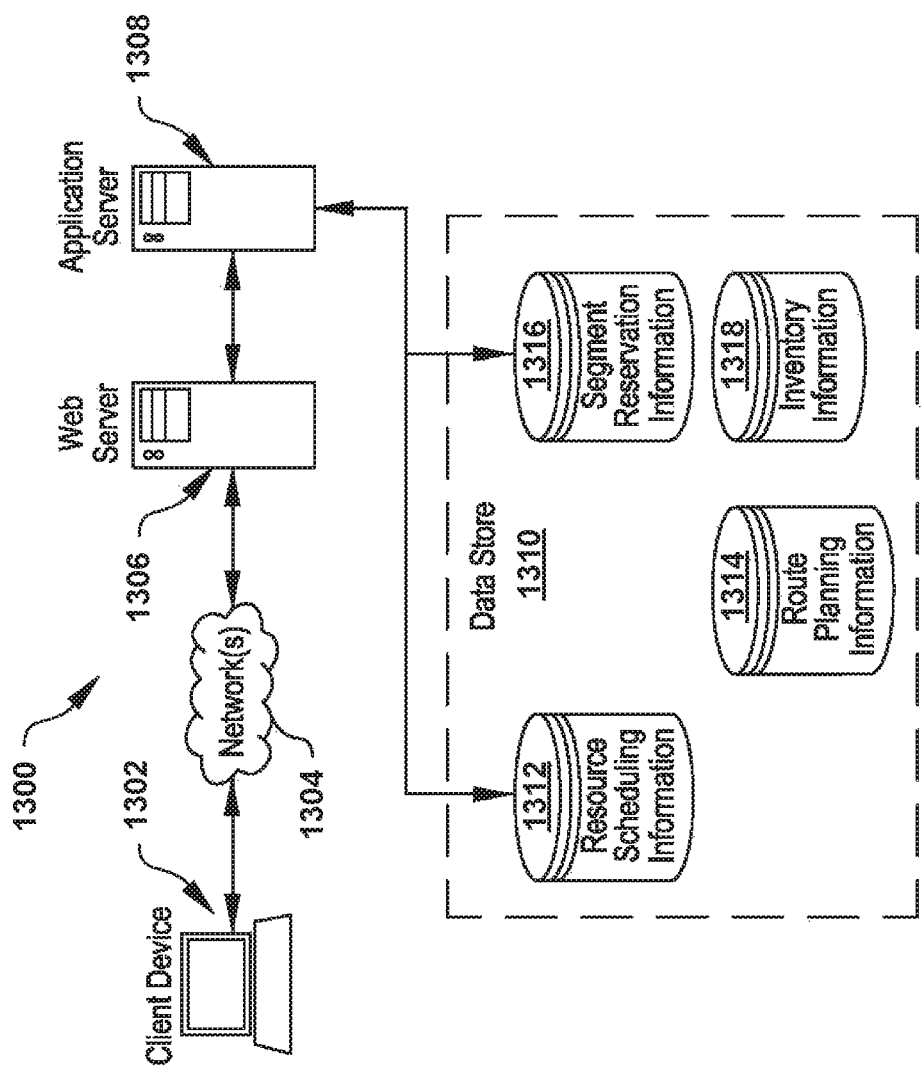
FIG. 17 illustrates an environment in which various embodiments can be implemented.

FIG. 17 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store 1310 can include inventory information 1318, for example, including identification of items stored in the inventory system and identification of the storage location for each of the respective inventory items. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the system 1300 in FIG. 17 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory management system, comprising:
   an inventory holder including inventory bins configured to store inventory items;
   three fixed radio frequency (RF) antennas transmitting RF interrogation signals and receiving RF response signals generated in response to the RF interrogation signals;
   a user-wearable unit configured to be worn in proximity to a user's hand, the user-wearable unit including a portable radio frequency (RF) transceiver configured to transmit the RF response signals in response to receiving the RF interrogation signals;
   an RF transceiver operatively coupled with the three fixed RF antennas; and
   a management module operatively coupled with the RF transceiver and configured to process signals generated by the RF transceiver to:
     continuously determine a location of the user-wearable unit in a three-dimensional space; and
     monitor performance of an inventory task assigned to the user by continuously comparing the location of the user-wearable unit in the three-dimensional space with one or more locations of the inventory bins in the three-dimensional space to detect an interaction between the user and one of the inventory bins, the inventory task assigned to the user being at least one of retrieving an inventory item from a designated inventory bin or placing an inventory item into the designated inventory bin.

2. The inventory management system of claim 1, wherein the user-wearable unit includes a haptic feedback mechanism that generates a haptic feedback to the user, the management module controlling operation of the haptic feedback mechanism via a control signal transmitted to the user-wearable unit, the haptic feedback indicating one or more directions in which the user should move the user's hand to interact with the designated inventory bin.

3. The inventory management system of claim 1, wherein:
   the user-wearable unit includes a motion detection unit configured to detect motion of the user-wearable unit; and
   the user-wearable unit is configured to transmit a signal indicative of a command input by the user generated by moving the user-wearable unit in a predetermined manner, the command input relating to accomplishment of the inventory system task.

4. The inventory management system of claim 1, further comprising a user-wearable grip sensor configured to generate a signal indicating that the user is holding an inventory item or the user is not holding an inventory item, the management module being configured to identify one of the inventory bins into which an inventory item is placed by the user or from which an inventory item is retrieved by the user based on output from the grip sensor and tracked locations of the user-wearable unit within the three-dimensional space.

5. The inventory management system of claim 1, further comprising a mobile drive unit configured to transport the inventory holder within an inventory facility, the inventory management system being configured to control the mobile drive unit to place the inventory holder at a fixed position relative to the three fixed RF antennas.

6. A system comprising:
   fixed RF antennas transmitting RF interrogation signals and receiving RF response signals;
   a user-wearable unit configured to be worn in proximity to a user's hand, the user-wearable unit including a portable RF transceiver configured to transmit at least one RF response signal in response to receiving the RF interrogation signals;
   an RF transceiver operatively coupled with the fixed RF antennas; and
   a management module operatively coupled with the RF transceiver and configured to process signals generated by the RF transceiver to continuously determine location of the user-wearable unit in a three-dimensional space and identify one of a plurality of locations in the three-dimensional space based on proximity of the user-wearable unit to the identified location to monitor performance of a task.

7. The system of claim 6, wherein the user-wearable unit includes a haptic feedback mechanism configured to generate a haptic feedback to the user, the management module controlling operation of the haptic feedback mechanism via a control signal transmitted to the user-wearable unit, the haptic feedback indicating at least one of:
   the identified location matches a designated location associated with the task;
   the identified location does not match a designated location associated with the task;
   an item held by the user has been identified by the management module;
   an item held by the user has not been identified by the management module; and
   guidance to the user to the designated location associated with the task.

8. The system of claim 6, wherein at least one of the RF response signals is indicative of an identification of the user.

9. The system of claim 6, wherein:
   the user-wearable unit includes a motion detection unit that detects motion of the user-wearable unit; and
   the user-wearable unit transmits a signal indicative of a command input by the user generated by moving the user-wearable unit in a predetermined manner, the command input relating to accomplishment of the task by the user.

10. The system of claim 9, wherein:
    the user-wearable unit includes a processor that processes output of the motion detection unit to detect the command input by the user; and
    the signal indicative of the command input is transmitted in response to detection of the command input by the processor.

11. The system of claim 6, wherein the management module is configured to process the location of the user-wearable unit via a processing mode selected from predetermined processing modes based on the location within the three-dimensional space, the predetermined processing modes relating to (a) retrieving an item from or placing an item into an inventory bin of an inventory holder, or (b) retrieving an item from or placing an item into an inventory tote.

12. The system of claim 6, further comprising a user-wearable grip sensor configured to generate-a signal indicating that the user is holding an item or the user is not holding an item, the management module being configured to identify one of the plurality of locations into which an item is placed by the user or from which an item is retrieved by the user based on output from the grip sensor.

13. The system of claim 6, wherein:
the user-wearable unit includes a motion detection unit generating output indicative of orientation of the user-wearable unit; and
the management module is configured to store locations and orientations of the user-wearable unit for a period of time into a memory.

14. The system of claim 6, further comprising a mobile drive unit configured to transport an inventory holder within an inventory facility, the system being configured to control the mobile drive unit to controllably position the inventory holder relative to the plurality of fixed RF antennas, the inventory holder including inventory bins comprising at least some of the plurality of locations.

15. A computer implemented method comprising:
transmitting RF interrogation signals from RF antennas;
receiving, via the RF antennas, RF response signals from a user-wearable unit worn in proximity to a user's hand responsive to the RF interrogation signals;
generating arrival time signals indicative of arrival times of the RF response signals at the RF antennas;
processing, by a management module, the arrival time signals to continuously track location of the user-wearable unit within a three-dimensional space that includes storage locations configured to store items;
identifying, by the management module, one of the storage locations based on proximity of the user-wearable unit relative to the identified storage location; and
monitoring performance of a task based on the identified storage location.

16. The computer implemented method of claim 15, further comprising at least one of:
controlling, by the management module, operation of a haptic feedback mechanism included in the user-wearable unit to communicate a haptic feedback to the user indicating that the identified storage location matches a designated storage location associated with the task;
controlling, by the management module, operation of a haptic feedback mechanism included in the user-wearable unit to communicate a haptic feedback to the user indicating that the identified storage location does not match a designated storage location associated with the task;
controlling, by the management module, operation of a haptic feedback mechanism included in the user-wearable unit to communicate a haptic feedback to the user indicating that an item held by the user has been identified by the management module;
controlling, by the management module, operation of a haptic feedback mechanism included in the user-wearable unit to communicate a haptic feedback to the user indicating that an item held by the user has not been identified by the management module; and
controlling, by the management module, operation of a haptic feedback mechanism included in the user-wearable unit to communicate a haptic feedback to the user guiding the user to a designated storage location associated with the task.

17. The computer implemented method of claim 15, comprising:
receiving a signal from the user-wearable unit based on output from a motion detection unit included in the user-wearable unit, the signal being indicative of a command input by the user generated by moving the user-wearable unit in a predetermined manner, the command input relating to accomplishment of the task by the user; and
identifying, by the management module, motion of the user-wearable unit based on the output from the motion detection unit as part of monitoring performance of the task.

18. The computer implemented method of claim 15, comprising:
receiving a signal from the user-wearable unit based on output from a motion detection unit included in the user-wearable unit, the signal being indicative of a command input by the user generated by moving the user-wearable unit in a predetermined manner, the output from the motion detection unit being processed by a processor included in the user-wearable unit to detect the command input by the user; and
processing, by the management module, the command input as part of monitoring performance of the task.

19. The computer implemented method of claim 15, further comprising receiving, by the management module, data from the user-wearable unit indicative of at least one of an identification of the user, whether the user-wearable unit is associated with the user's left hand or right hand, a charge state of the user-wearable unit, an operational status of the user-wearable unit or a duration of use of the user-wearable unit.

20. The computer implemented method of claim 15, comprising:
receiving, by the management module, data indicative of orientation of the user-wearable unit based on output from a motion detection unit included in the user-wearable unit; and
storing into a memory, by the management module, data indicative of locations and orientations of the user-wearable unit for a period of time.

* * * * *